United States Patent
Iino

(10) Patent No.: US 10,725,543 B2
(45) Date of Patent: Jul. 28, 2020

(54) INPUT DEVICE, DISPLAY DEVICE, AND METHOD FOR CONTROLLING INPUT DEVICE

(71) Applicant: FUJITSU TEN LIMITED, Kobe-shi, Hyogo (JP)

(72) Inventor: Masahiro Iino, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 230 days.

(21) Appl. No.: 15/388,773

(22) Filed: Dec. 22, 2016

(65) Prior Publication Data

US 2017/0220113 A1  Aug. 3, 2017

(30) Foreign Application Priority Data

Feb. 2, 2016 (JP) .................................. 2016-018350

(51) Int. Cl.
| | | |
|---|---|---|
| *G06F 3/048* | (2013.01) | |
| *G06F 3/01* | (2006.01) | |
| *G06F 3/0488* | (2013.01) | |
| *G06F 3/16* | (2006.01) | |

(52) U.S. Cl.
CPC .......... *G06F 3/016* (2013.01); *G06F 3/04883* (2013.01); *G06F 3/167* (2013.01); *G06F 2203/014* (2013.01); *G06F 2203/04808* (2013.01)

(58) Field of Classification Search
CPC ...................................................... G06F 3/048
See application file for complete search history.

(56) References Cited

U.S. PATENT DOCUMENTS

| | | | | |
|---|---|---|---|---|
| 2010/0328224 A1* | 12/2010 | Kerr | .................... | G06F 3/04883 345/173 |
| 2011/0025480 A1* | 2/2011 | Hwang | ............... | H04M 19/047 340/407.1 |
| 2011/0074714 A1* | 3/2011 | Ogawa | .................. | G06F 3/0485 345/173 |
| 2011/0122080 A1* | 5/2011 | Kanjiya | ............. | G06F 3/04883 345/173 |

FOREIGN PATENT DOCUMENTS

| | | |
|---|---|---|
| JP | 2008-508601 A | 3/2008 |
| JP | 2010-055282 A | 3/2010 |
| JP | 2010-541071 A | 12/2010 |
| JP | 2013-235614 A | 11/2013 |

* cited by examiner

*Primary Examiner* — Pei Yong Weng
(74) *Attorney, Agent, or Firm* — Oliff PLC

(57) ABSTRACT

An input device according to an embodiment includes a detection unit, a touch position number calculation unit, a vibration unit, and a vibration control unit. The detection unit detects one or more touch positions on an operation surface. The touch position number calculation unit calculates the number of the touch positions detected by the detection unit. The vibration unit vibrates the operation surface. The vibration control unit controls the vibration unit to provide different vibration modes depending on the number of the touch positions calculated by the touch position number calculation unit.

11 Claims, 14 Drawing Sheets

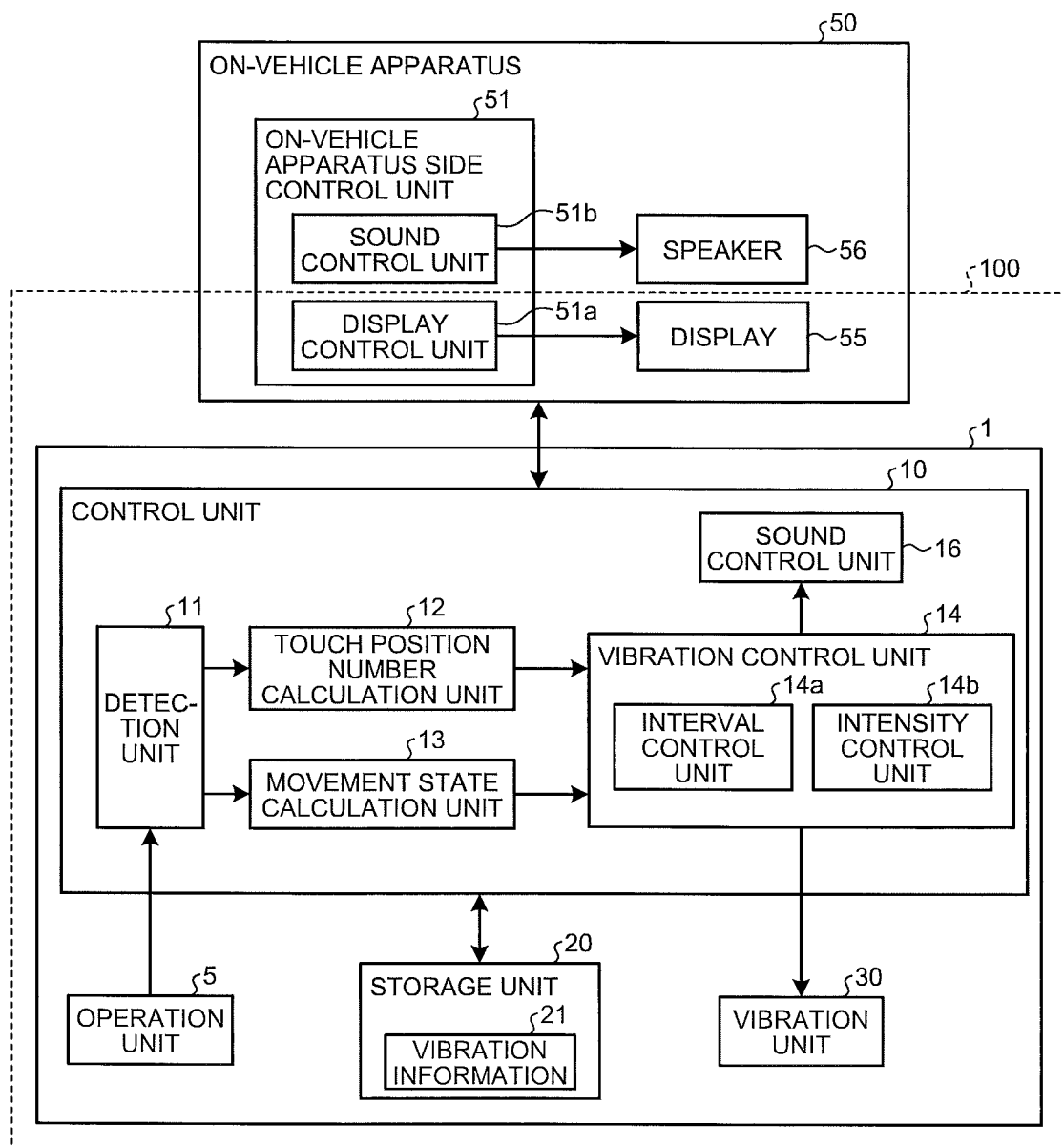

FIG.3

| NUMBER OF TOUCH POSITIONS | MOVEMENT DIRECTION OF TOUCH POSITIONS | FUNCTION | VIBRATION PATTERN |
|---|---|---|---|
| 1 (SINGLE-TOUCH OPERATION) | RIGHT | TRACK-UP | P1 |
| | LEFT | TRACK-DOWN | P2 |
| | UP | VOLUME-UP | P3 |
| | DOWN | VOLUME-DOWN | P4 |
| | ... | ... | ... |
| 2 (MULTI-TOUCH OPERATION) | UP OR RIGHT | ALBUM-UP | P5 |
| | DOWN OR LEFT | ALBUM-DOWN | P6 |
| | ... | ... | ... |

FIG.10

| TARGET DEVICE | GESTURE OPERATION | FUNCTION | VIBRATION PATTERN |
|---|---|---|---|
| AIR CONDITIONER | CIRCULAR | WIND DIRECTION ADJUSTMENT | P10 |
| | TRIANGULAR | INTERNAL AIR CIRCULATION/OUTSIDE AIR INTRODUCTION SWITCH | P10 (→P12) |
| | QUADRANGULAR | TEMPERATURE/AIR VOLUME ADJUSTMENT | P10 (→P13) |
| | ... | ... | ... |
| AUDIO | LEFT | AUDIO IMAGE DISPLAY SWITCH | P10 (→P14) |
| NAVIGATION DEVICE | RIGHT | NAVIGATION IMAGE SWITCH | P10 (→P15) |
| TELEPHONE | ... | ... | ... |
| ... | ... | ... | ... |

22

INPUT DEVICE, DISPLAY DEVICE, AND METHOD FOR CONTROLLING INPUT DEVICE

CROSS-REFERENCE TO RELATED APPLICATION

This application is based upon and claims the benefit of priority of the prior Japanese Patent Application No. 2016-018350, filed on Feb. 2, 2016, the entire contents of which are incorporated herein by reference.

FIELD

The embodiments discussed herein are directed to an input device, a display device, and a method for controlling an input device.

BACKGROUND

Conventionally, an, input device has been known that provides a user with a sense of touch to inform that input operation has been accepted. For example, such an input device generates vibration depending on pressing force provided by a user to inform the user that input operation has been accepted (see, for example, Japanese Laid-open Patent Publication No. 2013-235614).

However, the input device accepts, for example, a single-touch operation caused by a one-finger contact of a user and a multi-touch operation caused by a multi-finger contact of the user, in some cases. Because the input device according to a conventional technology has a configuration of generating a vibration depending on only a pressing force, the user may not recognize whether or not the input device reliably accepts a user's touch as the multi-touch operation in case of the multi-finger contact of the user, for example, and thus the operability of the input device may decrease.

Thus, the conventional technology has room for improvement in terms of causing a user to recognize contents of an accepted input operation to improve the operability.

SUMMARY

An input device according to an embodiment includes a detection unit, a touch position number calculation unit, a vibration unit, and a vibration control unit. The detection unit detects one or more touch positions on an operation surface. The touch position number calculation unit calculates the number of the touch positions detected by the detection unit. The vibration unit vibrates the operation surface. The vibration control unit controls the vibration unit to provide different vibration modes depending on the number of the touch positions calculated by the touch position number calculation unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a block diagram illustrating a configuration example of the input device and the like;

FIG. 3 is a diagram illustrating a specific example of vibration information;

FIG. 10 is a diagram illustrating a specific example of gesture information;

DESCRIPTION OF EMBODIMENTS

First Embodiment

First, a first embodiment will be explained.

Figure 1A:
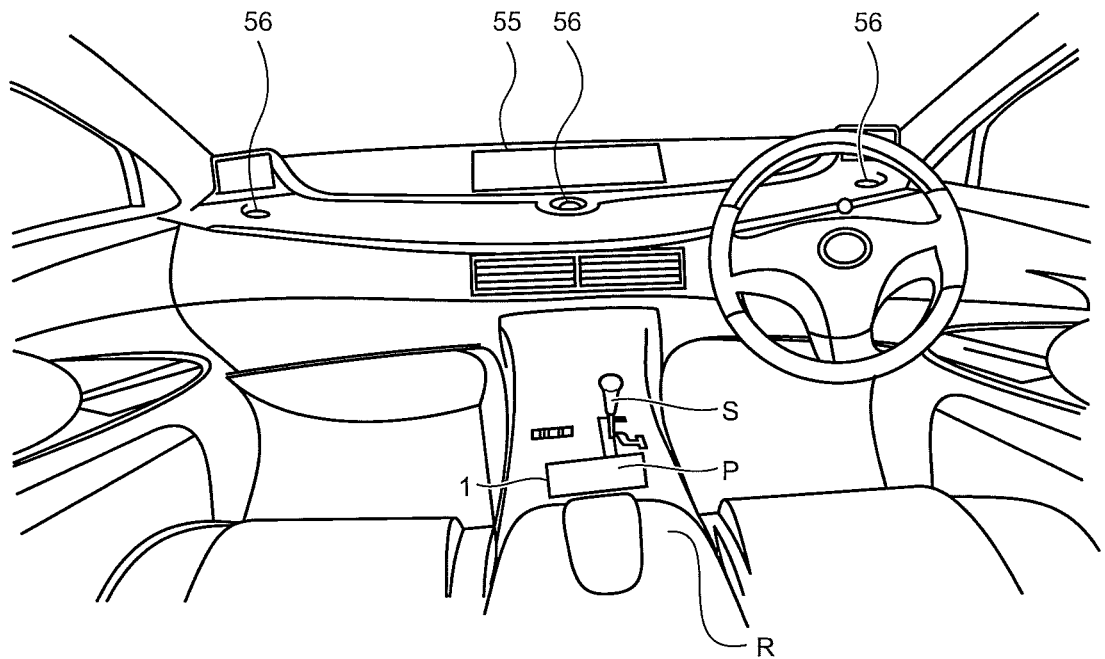
FIG. 1A is a diagram illustrating a mounted example of an input device according to a first embodiment.
Figure 1B:
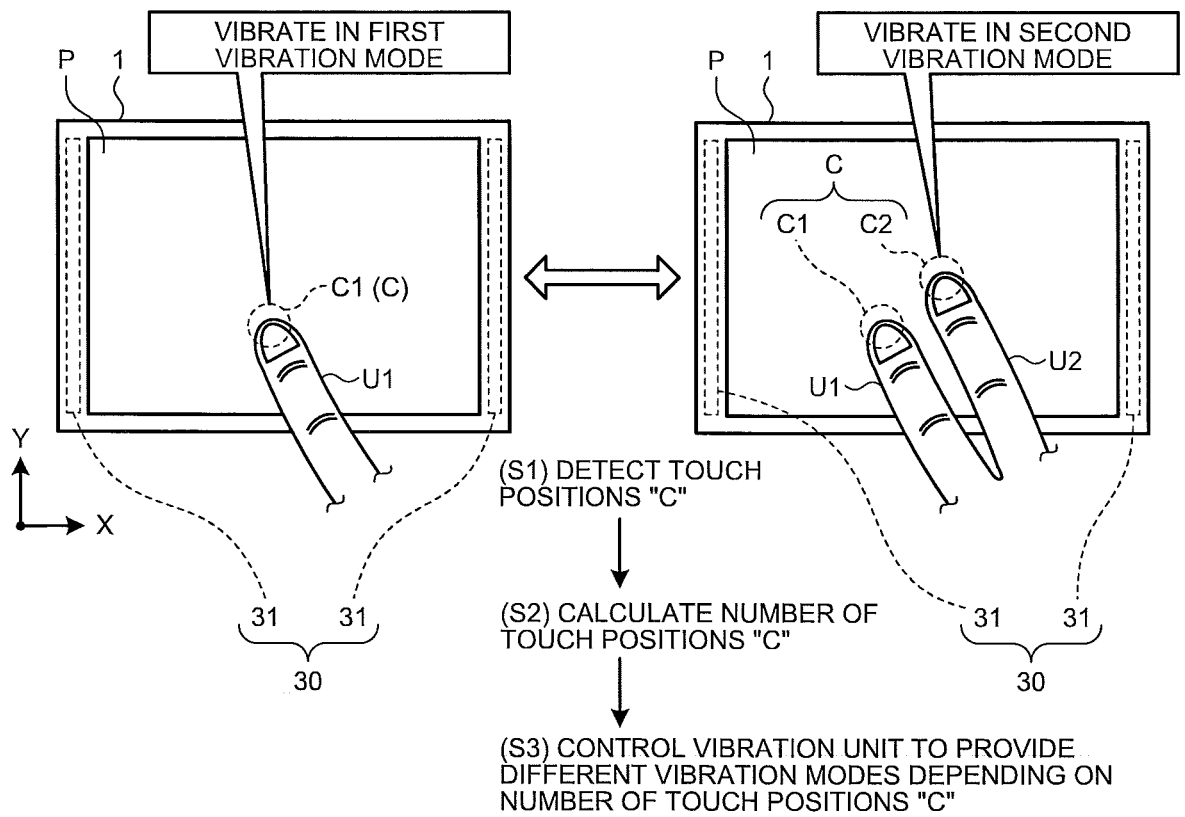
FIG. 1B is a diagram illustrating an outline of a method for controlling an input device according to the first embodiment.

1. Outline of Input Device and Method For Controlling An Input Device Hereinafter, first, the outline of an input device and a method for controlling an input device according to the first embodiment will be explained with reference to FIGS. 1A and 1B. FIG. 1A is a diagram illustrating a mounted example of the input device according to the first embodiment. FIG. 1B is a diagram illustrating the outline of a method for controlling an input device according to the first embodiment.

As illustrated in FIG. 1A, an input device 1 according to the present embodiment is mounted on a vehicle. The input device 1 is connected to, for example, an on-vehicle apparatus 50 to be mentioned later in FIG. 2 via a network, and functions as an input device of the on-vehicle apparatus 50. The input device 1 includes an operation accepting component (hereinafter, may be referred to as "operation surface 'P'") such as a touch-pad that accepts an input operation of a user.

The operation surface "P" is arranged at the position allowing a driver to operate easily, for example, the vicinity of a shift lever "S" of a center console and the like. In the example illustrated in FIG. 1A, the operation surface "P" is arranged between an armrest "R" and the shift lever "S". Therefore, the user can operate the operation surface "P" with his/her arm putting on the armrest. Thus, the user can easily operate the input device 1 without changing the driving posture.

The on-vehicle apparatus 50 (see FIG. 2) includes various devices such as an audio, an air conditioner, a vehicle navigation system. Therefore, the user operates the input device 1, so that it is possible to operate the various devices. The on-vehicle apparatus 50 includes a display 55 that displays a predetermined image and a speaker 56 (one example of sound output unit) that outputs a predetermined sound.

The images to be displayed on the display 55 include an image that indicates situations of the audio and the air conditioner, a map and the like that are images for performing navigation of a vehicle, a video of the television or the Internet, and the like. The sounds to be output from the speaker 56 include the sound and music of the audio, the television, the video, and the like, the sound for performing navigation of a vehicle, etc.

When accepting an input operation from a user, the aforementioned input device 1 causes to generate vibration depending on the input operation, thereby, it is possible to cause the user to recognize the acceptance of the input operation.

However, the input device 1 accepts, for example, a single-touch operation that is an operation caused by a contact using one finger "U1" of the user (see FIG. 1B) and a multi-touch operation that is an operation caused by a contact using a plurality of fingers "U1" and "U2" (see FIG. 1B) as input operations in some cases. The configuration of the conventional input device merely causes to generate vibration depending on a pressing force caused by a user, and thus, the user can not recognize whether or not the input device reliably accepts a contact using, for example, a plurality of fingers as a multi-touch operation, therefore the operability of the input device may decrease.

Therefore, the input device 1 according to the present embodiment is configured to control a vibration mode of the operation surface "P" depending on contents of the accepted input operation. Thus, the input device 1 can cause the user to intuitively understand contents of the input operation by using the feel, so that it is possible to improve the operability.

Hereinafter, the outline of a method for controlling the input device 1 according to the present embodiment will be explained with reference to FIG. 1B. As illustrated in FIG. 1B, the input device 1 includes the aforementioned operation surface "P" and a vibration unit 30 that vibrates the operation surface "P". The vibration unit 30 includes, for example, one or more vibration elements 31. Herein, the vibration unit 30 is exemplified, which includes two vibration elements 31 that are arranged at respective positions where the operation surface "P" is arranged therebetween. In FIG. 1B, the case in which the number of the vibration elements 31 is two is exemplified, however, the number of the vibration elements 31 may be one, three or more. Moreover, the vibration unit 30 is not limited to the vibration element(s) 31, and may include a motor that vibrates the operation surface "P" and the like.

The vibration element 31 includes, for example, a piezoelectric element, and can vibrate the operation surface "P" in an ultrasonic region band. For example, when the vibration element 31 is caused to vibrate in a state where a user presses the operation surface "P", an air layer is formed between a finger and the operation surface "P", and thus, a frictional force can be changed, so that it is possible to change the feel to be given to the user.

The change of the vibration mode of the vibration unit 30 changes the feel. The change of the generation interval, the vibration intensity, the vibration frequency, etc. of the vibration controls the vibration mode.

For example, in a case where the vibration element 31 vibrates the operation surface "P" in the ultrasonic region, the aforementioned air layer is formed between the operation surface "P" and the finger of the user and the frictional force therebetween is reduced, so that the smooth feel can be given to the user. Moreover, switching of generation interval of the vibration of the vibration elements 31 at a predetermined cycle can give the user the feel as if concavity and convexity existed on the operation surface "P". In this case, alteration in the vibration intensity of the vibration element 31 can also change the degree of the aforementioned feel.

Thus, the input device 1 can change the vibration mode of the vibration unit 30 to change the value of the frictional force between the user and the operation surface "P", therefore, the feel to be given to the user can be changed.

Therefore, the input device 1 according to the present embodiment is configured to determine, for example, whether an input operation to the operation surface "P" is a single-touch operation or a multi-touch operation, and to control the vibration unit 30 to provide different vibration modes depending on contents of the determined input operation.

Specifically, as illustrated in FIG. 1B, first, the input device 1 detects a touch position "C" on the operation surface "P" (Step S1). In FIG. 1B, the state where a single-touch operation is performed on the operation surface "P" is illustrated in the left drawing, the state where a multi-touch operation is performed on the operation surface "P" is illustrated in the right drawing, and the touch positions "C" are illustrated by using closed curves of dashed lines.

Next, the input device 1 calculates the number of the detected touch positions "C" (Step S2). In other words, in a case of a single-touch operation, the touch position "C" is one touch position "C1.", in a case of a multi-touch operation, the touch positions "C" are a plurality (here "two") of touch positions "C1" and "C2", and thus, the input device 1 is configured to determine contents of the input operation on the basis of the number of the touch positions "C".

Next, the input device 1 controls the vibration unit 30 to provide vibration modes depending on the number of the calculated touch positions "C" (Step S3). Specifically, for example, in a case where the number of the touch positions "C" is one, the input device 1 determines a single-touch operation, and controls the vibration unit 30 to be in the first vibration mode dependent on a single-touch operation. On the other hand, for example, in a case where the number of the touch positions "C" is two or more, the input device 1 determines a multi-touch operation, and controls the vibration unit 30 to be in the second vibration mode dependent on a multi-touch operation.

For example, the generation intervals of vibration in the aforementioned first and second vibration modes of the vibration unit 30 are assumed to differ from each other. Thus, for example, the length of concavity and convexity in the feel of the aforementioned concavity and convexity differs between the first and second vibration modes, and thus, the input device 1 can change the feel to be given to the user, so that it is possible to cause the user to recognize the contents of the accepted input operation.

The vibration control to change the feel to be given to the user is not limited to the aforementioned control in which the generation interval of vibration of the vibration unit 30 is made different. In other words, for example, the vibration intensities of the vibration unit 30 may differ from each other between the first and second vibration modes. In this case, the intensity of concavity and convexity in the feel of the aforementioned concavity and convexity differs between the first and second vibration modes, so that it is possible to change the feel to be given to the user. The contents of the aforementioned feel is merely an example, the input device 1 can change the vibration mode of the vibration unit 30, and thus, can give various kinds of feel to the user.

Thus, the input device 1 is configured to control the vibration unit 30 to provide different vibration modes depending on the number of the touch positions "C". Thereby, the input device 1 can cause the user to intuitively recognize contents of the accepted input operation by using the difference between the vibration modes, so that it is possible to improve the operability.

Moreover, the user can understand contents of an input operation without visually recognizing a hand on the operation surface "P" or the display 55, and thus, in a case of controlling the on-vehicle apparatus 50, can properly use a single-touch operation and a multi-touch operation on the operation surface "P", so that it is possible to perform a right operation.

The input device 1 and the display 55 of the on-vehicle apparatus 50 arranged separately are exemplified in the aforementioned, however, not limited thereto. In other words, for example, the input device 1 and the display 55 may be integrated with each other to constitute a touch panel.

In this case, the input device 1 can give, to the user, the feel dependent on an image displayed on a touch panel. Thereby, the operational feeling using the tactile sense in addition to the visual sense can be given to the user. In this case, for example, the sound dependent on the feel to be given to the user from a touch panel may be output.

The apparatus connected to the input device 1 is the on-vehicle apparatus 50 in the aforementioned, however, is merely an example and not limited thereto, the apparatus connected to the input device 1 may be, for example, a smartphone, a tablet terminal, a personal computer, etc.

2. Configuration of Input Device

Next, the input device 1 that is controlled by using the aforementioned control method will be explained more specifically. First, a configuration example of the input device 1 and the like according to the present embodiment will be explained with reference to FIG. 2. FIG. 2 is a block diagram illustrating a configuration example of the input device 1 and the like according to the embodiment.

As illustrated in FIG. 2, the input device 1 includes an operation unit 5, a control unit 10, a storage unit 20, and a vibration unit 30. The input device 1 is connected to the on-vehicle apparatus 50.

The operation unit 5 includes, for example, a planar-shaped sensor such as a touch-pad, and further includes the operation surface "P" (see FIG. 1B) that accepts an input operation performed by a user. When detecting the touch position "C" on the operation surface "P", the operation unit 5 outputs a sensor value that indicates the touch position "C" to the control unit 10.

The vibration unit 30 vibrates the operation surface "P" depending on the control of the control unit 10 to be mentioned later. The vibration unit 30 includes the vibration elements 31 (see FIG. 1B) that vibrates, for example, the operation surface "P" in the ultrasonic region band. The vibration unit 30 may vibrate the operation surface "P" in a frequency band less than the ultrasonic region band.

The control unit 10 controls the vibration mode of the vibration unit 30 to control the vibration and the like of the operation surface "P". The control unit 10 includes, for example, a microcomputer including a Central Processing Unit (CPU), a Read Only Memory (ROM), a Random Access Memory (RAM), an input/output port, etc., and various circuits.

The control unit 10 includes a detection unit 11, a touch position number calculation unit 12, a movement state calculation unit 13, a vibration control unit 14, and a sound control unit 16. The storage unit 20 is constituted of a storing device such as a non-volatile memory and hard disk drive, and stores vibration information 21.

The detection unit 11 detects the touch position. "C" on the operation surface "P". Specifically, the detection unit 11 detects the touch position "C" on the operation surface "P" on the basis of a sensor value to be input from the operation unit 5, and outputs information on the detected touch position "C" to the touch position number calculation unit 12 and the movement state calculation unit 13.

The detection unit 11 executes a detection process of the touch position "C" in a predetermined cycle even in a case where the touch position "C" moves on the operation surface "P", and thus, can detect the touch position "C" in accordance with the movement.

The touch position number calculation unit 12 calculates the number of the touch positions "C" detected by the detection unit 11. The touch position number calculation unit 12 outputs information on the calculated number of the touch positions "C" to the vibration control unit 14 and the on-vehicle apparatus 50.

The movement state calculation unit 13 calculates a movement state of the touch position "C" with respect to the X-axis and Y-axis directions (see FIG. 1B) on the operation surface "P" from the plurality of touch positions "C" detected by the detection unit 11, which temporally continues. Specifically, the movement state calculation unit 13 calculates a motion vector by using, for example, the plurality of touch positions "C" input from the detection unit 11 in a predetermined cycle, and further calculates the movement amount of each component in the X-axis and Y-axis directions by using the motion vector.

Thus, the movement state calculation unit 13 calculates the movement direction and movement amount in the X-axis direction, the Y-axis direction, etc. of the touch position(s) "C". The movement state calculation unit 13 outputs information on the calculated movement direction and movement amount of the touch position(s) "C" to the vibration control unit 14 and the on-vehicle apparatus 50.

The vibration control unit 14 includes an interval control unit 14a and an intensity control unit 14b, and controls the vibration mode of the vibration unit 30 on the basis of the number, the movement directions, and the movement amounts of the touch positions "C".

The interval control unit 14a controls a generation interval of vibration of the vibration unit 30 on the basis of the number and movement directions of the touch positions "C", the vibration information 21, etc. The interval control unit 14a controls, for example, the interval between "ON" and "OFF" of the vibration of the vibration unit 30 (for example, ratio between "ON" and "OFF" of vibration of vibration element 31) to control the generation interval of the vibration. In a case where the vibration of the vibration unit 30 is "OFF", the vibration intensity is assumed to be zero. Detailed contents of the vibration information 21 will be mentioned later with reference to FIG. 3.

The intensity control unit 14b controls the vibration intensity of the vibration unit 30 on the basis of the number and movement directions of the touch positions "C", the vibration information 21, etc. The intensity control unit 14b adjusts, for example, the driving voltage that drives the vibration elements 31 included in the vibration unit 30 to control the vibration intensity.

Herein, the on-vehicle apparatus 50 will be explained. The on-vehicle apparatus 50 includes an on-vehicle apparatus side control unit 51 in addition to the aforementioned display 55 and speaker 56. The on-vehicle apparatus side control unit 51 is a control unit that controls whole of the on-vehicle apparatus 50, and includes, for example, a display control unit 51a and a sound control unit 51b.

The display control unit 51a causes the display 55 to display an image depending on the touch position(s) "C". The detailed control of the display 55 caused by the display control unit 51a will be mentioned later with reference to FIGS. 4A, 4B, etc.

The sound control unit 51b controls the speaker 56 on the basis of, for example, a signal and the like to be input from the sound control unit 16 on the input device 1 side to be mentioned later to cause the speaker 56 to output sound.

Illustration thereof is omitted, the on-vehicle apparatus side control unit 51 controls various devices (audio, air conditioner, vehicle navigation system, etc.) of the on-vehicle apparatus 50 depending on, for example, the number and movement directions of the touch positions "C", etc., which are input from the touch position number calculation unit 12 and the movement state calculation unit 13.

Herein, an input operation on the operation surface "P" of a user, a pattern of a vibration mode according to the input operation, an image to be displayed on the display 55, etc. will be explained with reference to FIGS. 3, 4A, and 4B while exemplifying specific examples.

FIG. 3 is a diagram illustrating a specific example of the vibration information 21. FIGS. 4A and 4B are diagrams illustrating a specific example of images displayed on the display 55. Herein, the case in which "audio" of the on-vehicle apparatus 50 is controlled by an input operation is exemplified for explanation.

In a case where, for example, an input operation such as a single-touch operation or a multi-touch operation is performed on the operation surface "P", the vibration information 21 includes information in which functions and vibration patterns of the vibration elements 31, which corresponds to respective operations, are defined so as to differ from each other.

More specifically, as illustrated in FIG. 3, the vibration information 21 includes, for example, an item of the number of the touch positions "C", an item of movement directions of the touch position(s) "C", an item of functions, and an item of vibration patterns. To the item of the number of the touch positions "C", for example, a case where the number of the touch positions "C" is one and a case where the number of the touch positions "C" is two are assigned. In other words, to the item of the number of the touch positions "C", an acceptance of a single-touch operation in a case where the number of the touch positions "C" is one, and an acceptance of a multi-touch operation in a case where the number of the touch positions "C" is two are assigned.

Various functions and vibration patterns are associated with a movement direction of the touch position "C" in a single-touch operation and movement directions of the touch positions "C" in a multi-touch operation. Specifically, to items of the movement direction of the touch position "C", "right" as a movement of the touch position "C" in a positive direction with respect to the X-axis (see FIG. 1B), "left" as a movement thereof in a negative direction with respect to the X-axis, "up" as a movement thereof in a positive direction with respect to the Y-axis (see FIG. 1B), and "down" as a movement thereof in a negative direction with respect to the Y-axis are assigned, respectively. The movement directions of the touch, position(s) "C" are not limited to the aforementioned, other direction such as an aslant direction may be assigned.

In the vibration information 21, in a case where, for example, the number of the touch positions "C" is one and the movement direction thereof is "right", a function of "track-up" is assigned to the function item, and a vibration pattern "P1" dependent on the number and movement direction of the touch positions "C" is assigned to the vibration pattern item.

In the vibration information 21, in a case where, for example, the number of the touch positions "C" is one and the movement direction is "left", a function of "track-down" is assigned to the function item, and a vibration pattern "P2" is assigned to the vibration pattern item.

The aforementioned "track-up" and "track-down" will be explained with reference to FIG. 4A. As illustrated in FIG. 4A, in a case of an audio mode that controls "audio" of the on-vehicle apparatus 50, an image dependent on the audio mode is displayed on the display 55.

In the example illustrated in FIG. 4A, for example, in a case where a song presently output from the speaker 56 is a song whose title is "A2" included in the album "A", a jacket image 62a of the album "A" is displayed at the center of the display 55, and information 61a that indicates the song title "A2" is displayed below the jacket image 62a.

In the display 55, information 61b that indicates the song title "A1" being a previous song of the song title "A2" is displayed on the left side of the information 61a, and information 61c that indicates the song title "A3" being immediately after the song title "A2" is displayed on the right side of the information 61a. Moreover, in a case where the on-vehicle apparatus 50 can reproduce albums "B", "C", and "D" other than the album "A", jacket images "62b", "62c", and "62d" of the albums "B", "C", and "D" are displayed so that the jacket images are overlapped with the jacket image 62a of the album "A" in back of the jacket image 62a.

In a state where the aforementioned image is displayed on the display 55, for example, when a user moves a finger to the right or left on the operation surface "P" by using a single-touch operation, the input device 1 outputs a signal that indicates "track-up" or "track-down" to the on-vehicle apparatus 50 on the basis of the vibration information 21. Thereby, the on-vehicle apparatus 50 alters a song being output from the song title "A2" to the song title "A1" in a case of "track-up", and alters a song being output from the song title "A2" to the song title "A3" in a case of "track-down". Thus, the input device 1 controls the on-vehicle apparatus 50 depending on the input operation from the user.

The vibration modes of the respective aforementioned vibration patterns "P1" and "P2" differ from each other. Specifically, for example, the generation interval of vibration of the vibration unit 30 in the vibration pattern P1 is comparatively long, the generation interval of vibration thereof in the vibration pattern P2 is longer than that of the vibration pattern P1, etc., the vibration modes thereof are set to be different from each other. Contents of the vibration modes of the aforementioned vibration patterns "P1" and "P2" are merely an example and not limited thereto.

The vibration control unit 14 reads a vibration pattern in the vibration information 21 depending on an input operation from a user, and controls the vibration unit 30 to be in the read vibration pattern. Thereby, the input device 1 can change the feel to be given to the user so that the length of concavity and convexity in the feel of the concavity and convexity is large in a case of the vibration pattern P1, and the length of concavity and convexity therein is small in a case of the vibration pattern P2. Therefore, the user can recognize that the input device 1 precisely accept the input operation by using the difference between the aforementioned feels.

Continuing the explanation of FIG. 3, in the vibration information 21, in a case where, for example, the number of the touch positions "C" is one and the movement direction is "up", a function of "volume-up" is assigned to the function item, and the vibration pattern "P3" is assigned to the vibration pattern item. In a case where the number of the touch positions "C" is one and the movement direction is "down", "volume-down" is assigned to the function item, and the vibration pattern "P4" is assigned to the vibration pattern item. Thus, in a case where a finger of a user moves up and down by using a single-touch operation, a function of controlling the volume of the speaker 56 is assigned.

Therefore, for example, when a finger of a user moves up or down on the operation surface "P" by using a single-touch operation, the input device 1 outputs a signal that indicates "volume-up" or "volume-down" to the on-vehicle apparatus 50. Thereby, the sound control unit 51b of the on-vehicle apparatus 50 increases or decreases the sound volume from the speaker 56 depending on the signal.

Figure 4A:
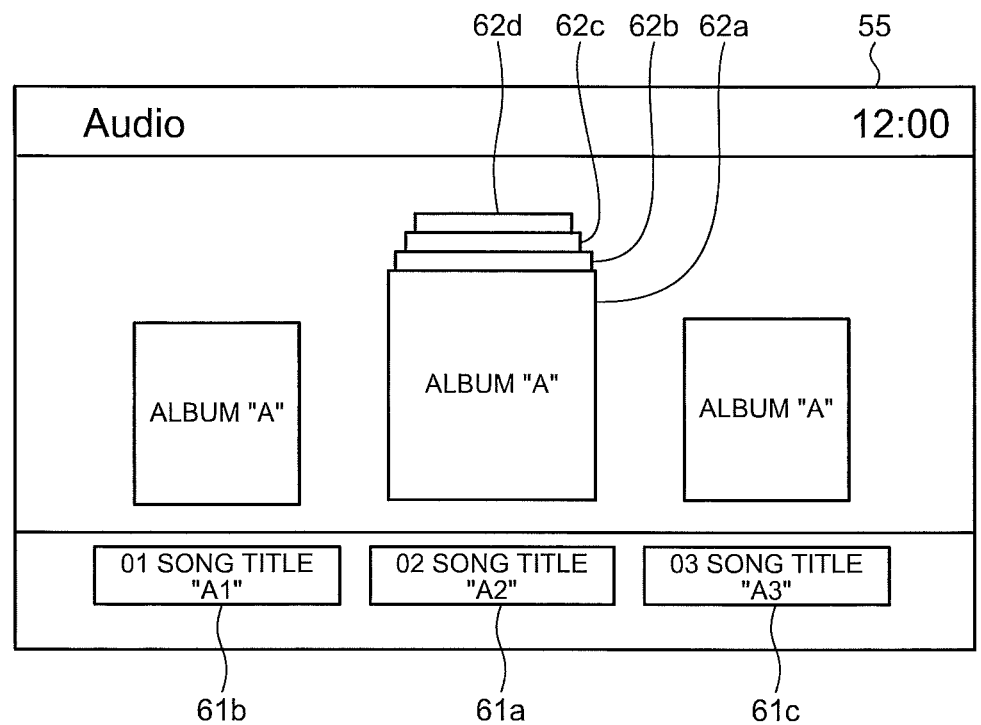
FIGS. 4A and 4B are diagrams illustrating specific examples of images that are displayed on a display.

As illustrated in FIG. 4A, in such a case that the information that indicates a function dependent on an input operation (here, volume control) is not displayed, the display control unit 51a of the on-vehicle apparatus 50 may display an image on the display 55 depending on the touch position "C".

Figure 4B:
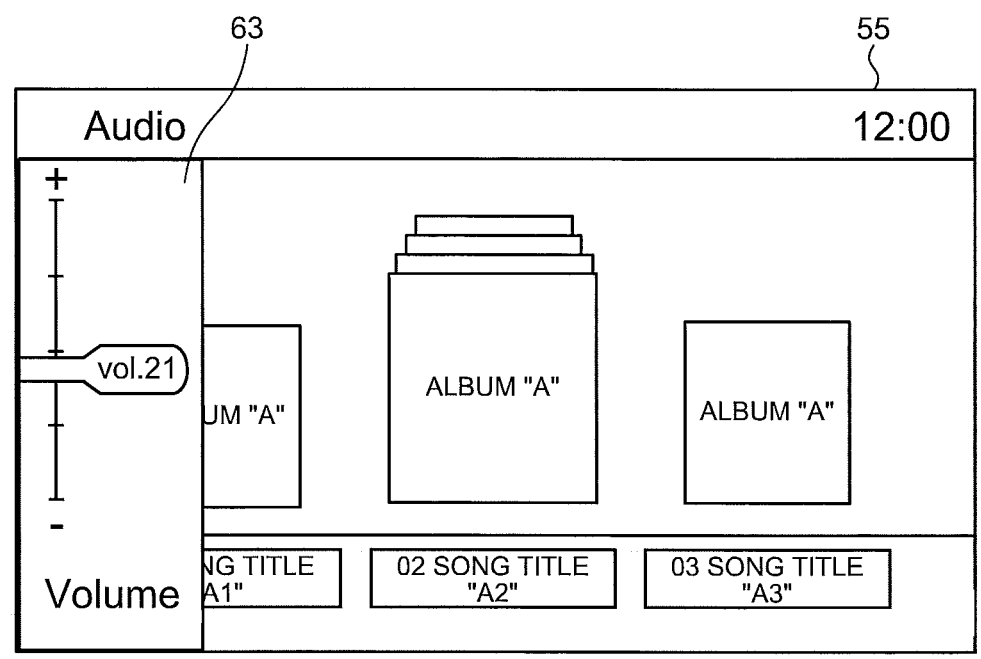

In other words, as illustrated in FIG. 4B, in a case where the finger of the user moves up or down by using a single-touch operation, the display control unit 51a may display a volume bar 63 that indicates the present volume on the left end side of the display 55. Thereby, the user can check the accepted input operation by using the visual sense in addition to the tactile sense, and thus, the operability of the input device 1 can be more improved. The displayed position, the shape, etc. of the volume bar 63 illustrated in FIG. 4B are merely an example and not limited thereto.

Continuing the explanation of FIG. 3, in the vibration information 21, in a case where, for example, the number of the touch positions "C" is two and the movement direction is "up" or "right", a function of "album-up" is assigned to the function item and a vibration pattern "P5" is assigned to the vibration pattern item. In a case where the number of the touch positions "C" is two and the movement direction is "down" or "left", "album-down" is assigned to the function item and the vibration pattern "P6" is assigned to the vibration pattern item.

Therefore, for example, when a finger of a user moves on the operation surface "P" "up" or "down" by using a multi-touch operation, the input device 1 outputs a signal that indicates "album-up" or "album-down" to the on-vehicle apparatus 50. Thereby, in a case of "album-up", the on-vehicle apparatus 50 alters the album being output from the speaker 56 from the album "A" to the album "D" whose jacket image is at the rearmost position in the screen illustrated in FIG. 4A. In this case, the display control unit 51a causes the jacket image 62d of the album "D" to be displayed at the foremost position.

On the other hand, in a case of "album-down", the on-vehicle apparatus 50 alters the album being output from the speaker 56 from the album "A" to the album "B" whose jacket image is at the rear position of the album "A" in the screen illustrated in FIG. 4A. In this case, the display control unit 51a causes the jacket image 62b of the album "B" to be displayed at the foremost position.

As described above, the vibration modes of the respective aforementioned vibration patterns "P5" and "P6" differ from each other. Herein, in an image displayed on the display 55, because "album-up" is a kind of an operation of moving a finger "up" by using a multi-touch operation to push the jacket image 62a of the album "A" in the depth direction of the screen, the vibration pattern "P5" may give, to a user, the feel of pushing into.

Figure 5A:
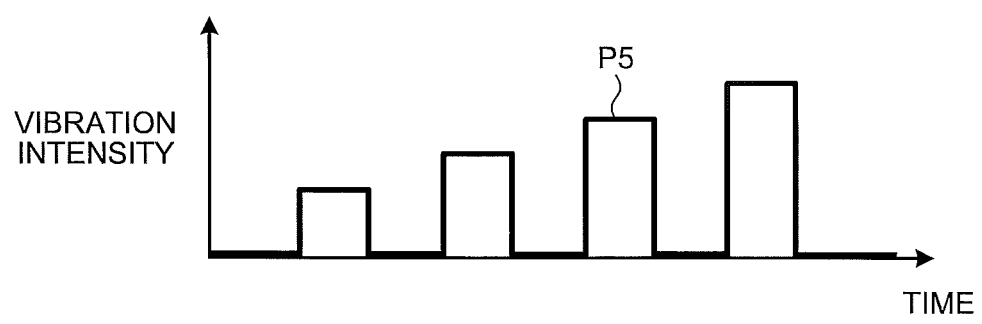
FIGS. 5A and 5B are diagrams illustrating vibration patterns.

FIG. 5A is a diagram illustrating the vibration pattern "P5". As illustrated in FIG. 5A, the vibration pattern "P5" is set so that the vibration intensity gradually increases. Herein, the difference of a frictional force on the operation surface "P" between a case where the vibration unit 30 is vibrating and a case where is not vibrating becomes larger depending on the vibration intensity during the vibrating.

Therefore, when, fingers of a user moves "up" on the operation surface "P" by using a multi-touch operation, the input device 1 gives, to the user, the feel as if gradually growing concavities and convexities existed on the operation surface "P". Thereby, the input device 1 can give, to the user, the feel of pushing the jacket image 62a of the album "A" in the depth direction of the screen.

On the other hand, in an image displayed on the display 55, because "album-down" is a kind of operation of moving fingers "down" by using a multi-touch operation to pull out the jacket image 62a of the album "A" from the screen, the vibration pattern "P6" may give, to a user, the feel of pulling out.

Figure 5B:
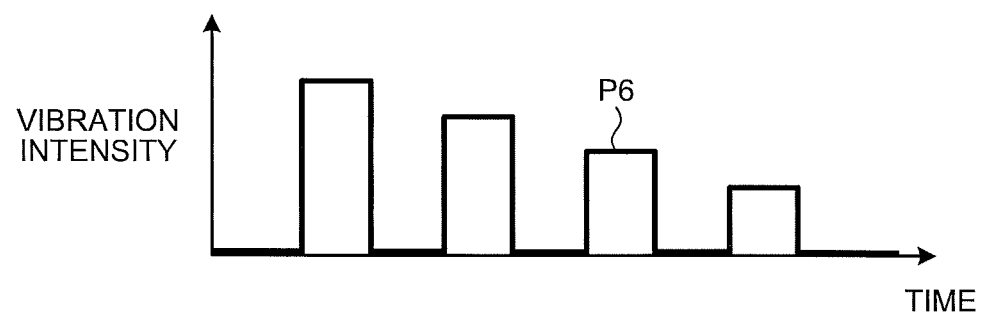

FIG. 5B is a diagram illustrating the vibration pattern "P6". As illustrated in FIG. 5B, the vibration pattern "P6" is set so that the vibration intensity gradually decreases. Therefore, when fingers of a user moves "down" on the operation surface "P" by using a multi-touch operation, the input device 1 gives, to the user, the feel as if initial large concavity and convexity and subsequent gradually shrinking concavities and convexities existed on the operation surface "P". Thereby, the input device 1 can give, to the user, the feel of pulling out the jacket image 62a of the album "A" from the screen.

As described above, the vibration patterns "P1" to "P6" are set to differ from each other. Therefore, the vibration control unit 14 controls the vibration unit 30 so as to be in different vibration modes depending on the number, the movement directions, and the movement amounts of the touch positions "C".

For example, the vibration modes of the vibration patterns "P1" to "P4" may be greatly differ from the vibration modes of the vibration patterns "P5" and "P6". Thereby, the input device 1 can give, to the user, the feel that greatly differs between in a case of accepting a single-touch operation and in a case of accepting a multi-touch operation.

Thereby, the user can recognize whether or not the input device 1 reliably accepts a contact by using, for example, a plurality of fingers as a multi-touch operation from the difference of the feel, and thus, the operability of the input device 1 can be improved.

Returning to the explanation of FIG. 2, the sound control unit 16 of the input device 1 causes the speaker 56 of the on-vehicle apparatus 50 to output the sound according to the vibration mode of the vibration unit 30. Specifically, the sound control unit 16 outputs a signal that indicates the sound according to the vibration mode of the vibration unit 30 to the sound control unit 51b in the on-vehicle apparatus 50, the sound control unit 51*b* controls and causes the speaker 56 to output sound on the basis of the signal.

Specifically, first, the sound control unit 16 acquires information on the present vibration mode of the vibration unit 30 from, for example, the vibration control unit 14. The information on the vibration mode includes information on the generation interval of vibration and the vibration intensity.

Subsequently, the sound control unit 16 causes the speaker 56 to output a sound effect, for example, "click", at the timing when the vibration unit 30 turns from "ON" to "OFF", namely the timing when the feel given to the user from the operation surface "P" turns from convex to concave, on the basis of the generation interval of vibration of the vibration unit 30. Thus, causing the sound control unit 16 to output a sound effect such as "click" at the timing of turning into concave can give, to the user, a sound effect dependent on the feel.

In this case, the sound control unit 16 controls the sound volume of the sound effect output from the speaker 56 on the basis of the vibration intensity of the vibration unit 30. In this case, the sound control unit 16 controls the sound volume of the sound effect to be larger as the vibration intensity of the vibration unit 30 is larger.

Thus, the sound control unit 16 causes the speaker 56 to output sound dependent on the vibration mode of the vibration unit 30 to feed back to the user a sound effect dependent on the feel given to the user, therefore the user can understand the operation contents by the auditory sense in addition to the tactile sense. Thereby, the operability of the user can be improved.

In a case where the input device 1 includes a sound output unit, the sound control unit 16 may cause the sound output unit to output the aforementioned sound effect. The aforementioned sound effect is merely an example, and may be properly changed. In this case, it is preferable that the sound control unit 16 is caused to output a sound effect dependent on the feel. Moreover, the sound effect is not needed to correspond to the feel. For example, the sound control unit 16 continuously changes the height of the frequency of the sound effect or the loudness of the sound volume depending on the movement direction of the touch position(s) "C" to cause the user to recognize the movement direction and movement amount of the touch position(s) "C". Or, the sound control unit 16 may be caused to output sound effects that differ from one movement direction of the touch position(s) "C" to another.

Moreover, in the example illustrated in FIG. 2, separately provided input device 1 and on-vehicle apparatus 50 are illustrated. However, not limited thereto, for example, the input device 1, and the display 55 and the display control unit 51*a* of the on-vehicle apparatus 50 may constitute a display device 100. In this case, the display device 100 can give, to the user, an operational feeling using the tactile sense in addition to the visual sense.

3. Process of Input Device According to First Embodiment

Figure 6:
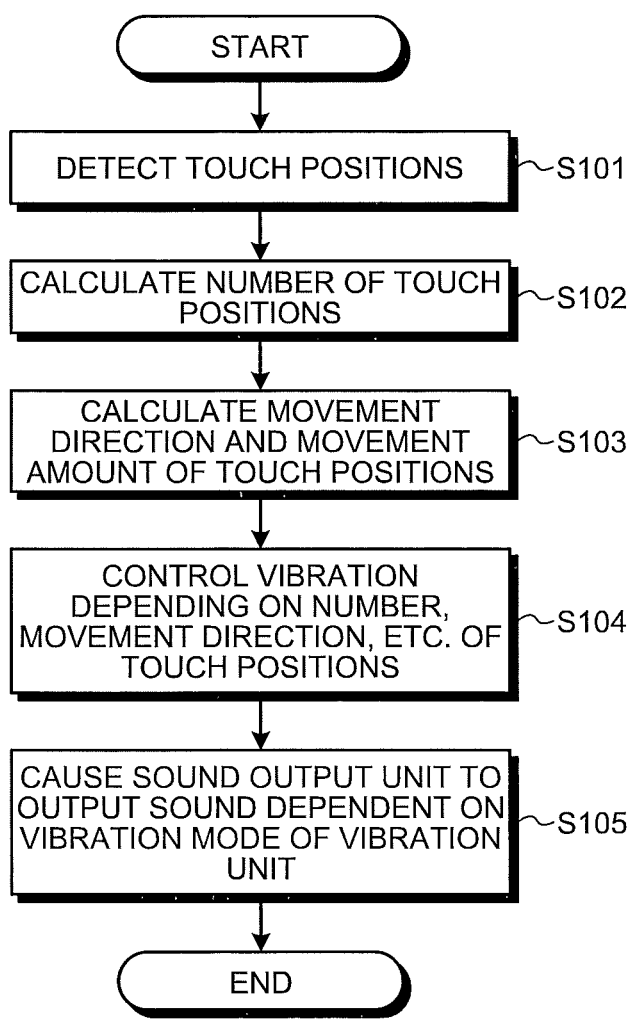
FIG. 6 is a flowchart illustrating one example of a processing procedure executed by the input device.

Next, a processing procedure to be executed by the input device 1 according to the present embodiment will be explained with reference to FIG. 6. FIG. 6 is a flowchart illustrating one example of a processing procedure to be executed by the input device 1, and the control unit 10 of the input device 1 repeatedly executes the process.

As illustrated in FIG. 6, the detection unit 11 of the input device 1 detects the touch position(s) "C" on the operation surface "P" (Step S101). Next, the touch position number calculation unit 12 calculates the number of the touch positions "C" (Step S102). Subsequently, the movement state calculation unit 13 calculates the movement direction and movement amount of the touch position(s) "C" (Step S103).

Subsequently, the vibration control unit 14 controls the vibration unit 30 so as to be in different vibration modes depending on the number, the movement direction, and the movement amount of the touch positions "C" (Step S104). The sound control unit 16 acquires a present vibration mode of the vibration unit 30 from the vibration control unit 14, causes the sound output unit (speaker 56) to output sound dependent on the vibration mode of the vibration unit 30 (Step S105), and terminates the process. The process of Step S105 and the vibration control process of Step S104 are executed in parallel, however, is not limited thereto.

Figure 7:
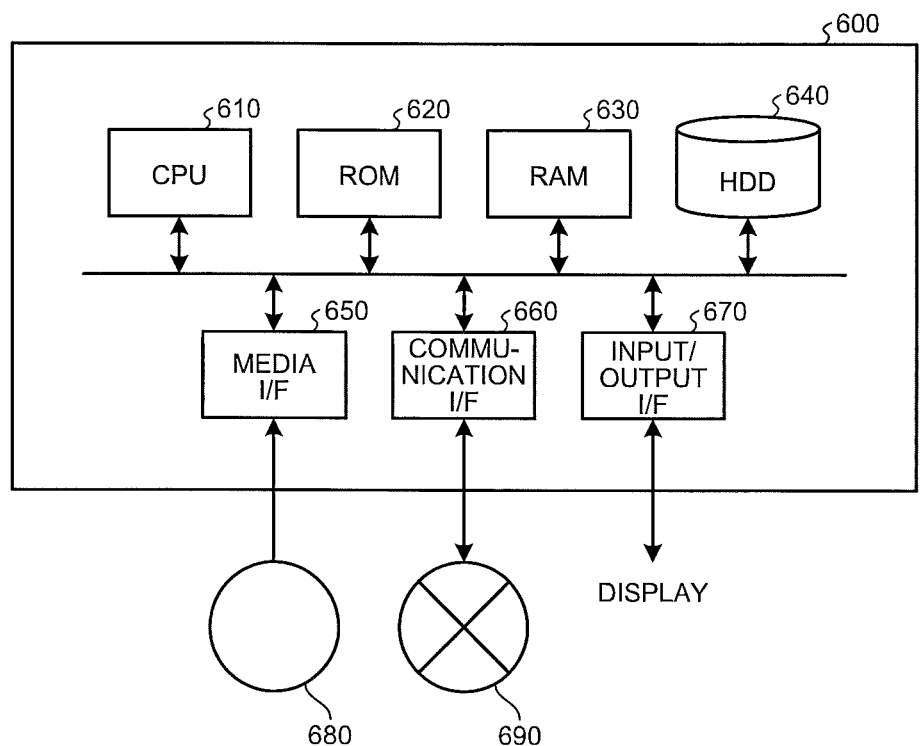
FIG. 7 is a diagram illustrating a hardware configuration example of a computer that realizes functions of the input device.

The input device 1 according to the present embodiment can be realized by using a computer 600 having a configuration illustrated in FIG. 7 as an example. FIG. 7 is a diagram illustrating a hardware configuration example of a computer that realizes functions of the input device 1.

The computer 600 includes a Central Processing Unit (CPU) 610, a Read Only Memory (ROM) 620, a Random Access Memory (RAM) 630, and a Hard Disk Drive (HDD) 640. The computer 600 further includes a media interface (media I/F) 650, a communication interface (communication I/F) 660, and an input/output interface (input/output I/F) 670.

The computer 600 may include a Solid State Drive (SSD), and the SSD may execute a part or whole of functions of the HDD 640. Moreover, the SSD may be provided instead of the HDD 640.

The CPU 610 operates on the basis of a program stored in at least one of the ROM 620 and the HDD 640 to control each unit. The ROM 620 stores a boot program to be executed by the CPU 610 at the start-up of the computer 600, a program depending on the hardware of the computer 600, etc. The HDD 640 stores a program to be executed by the CPU 610, data used by the program, etc.

The media I/F 650 reads a program and data stored in a storing medium 680 and provides the program and the data to the CPU 610 via the RAM 630. The CPU 610 loads the program on the RAM 630 from the storing medium 680 via the media I/F 650, and executes the loaded program. Or, the CPU 610 executes the program by using the data. The storing medium 680 includes, for example, a magneto-optical medium such as a Digital Versatile Disc (DVD), a Secure Digital card (SD card), a Universal Serial Bus memory (USB memory), etc.

The communication I/F 660 receives data from another device via a network 690, sends the data to the CPU 610, and sends the data generated by the CPU 610 to another device via the network 690. Or, the communication I/F 660 receives a program from another device via the network 690 and sends the program to the CPU 610, and the CPU 610 executes the program.

The CPU 610 controls the display such as a screen (not illustrated), the outputting device such as a speaker, and the input devices such as a keyboard, a mouse, and a button via the input/output I/F 670. The CPU 610 acquires data from the input device via the input/output I/F 670. The CPU 610 outputs the generated data to the display and the outputting device via the input/output I/F 670.

For example, in a case where the computer 600 functions as the input device 1, the CPU 610 of the computer 600 executes the program loaded on the RAM 630, and thus, realizes each function of the detection unit 11, the touch position number calculation unit 12, the movement state calculation unit 13, the vibration control unit 14, and the sound control unit 16.

The CPU 610 of the computer 600 reads these programs from, for example, the storing medium 680 and executes the read programs, as another example, may acquire these programs from another device via the network 690. Moreover, the HDD 640 may store information to be stored in the storage unit 20.

As described above, the input device 1 according to the first embodiment includes the detection unit 11, the touch position number calculation unit 12, the vibration unit 30, and the vibration control unit 14. The detection unit 11 detects the one or more touch positions "C" on the operation surface "P". The touch position number calculation unit 12 calculates the number of the touch positions "C" detected by the detection unit 11. The vibration unit 30 vibrates the operation surface "P". The vibration control unit 14 controls the vibration unit 30 to provide different vibration modes depending on the number of the touch positions "C" calculated by the touch position number calculation unit 12. Thereby, in the first embodiment, contents of the accepted input operation can be recognized by the user, so that it is possible to improve the operability.

Second Embodiment

Subsequently, a second embodiment will be explained.

4. Configuration of Input Device According to Second Embodiment

Next, a configuration of the input device 1 according to the second embodiment will be explained. The input device 1 is configured to accept a "cursor operation" and a "gesture operation" as input operations from a user in some cases.

The cursor operation is an input operation such as an aforementioned track up/down, which operates an indicator (cursor) that indicates a present input position in an image displayed on the display 55. A specific example of the cursor operation may include an input operation of adjusting the temperature and the air volume in a case where the display 55 displays an image for adjusting the temperature and the air volume of an air conditioner (see FIG. 9A to be mentioned later).

The gesture operation is an input operation to call a desired target device and function by, for example, a preliminary set predetermined gesture performed by a user regardless of a present input position on an image of the display 55. A specific example of the gesture operation includes, in a case where the display 55 displays an image for adjusting the temperature and the air volume of an air conditioner, an input operation that calls a function (for example, function of altering wind direction of air conditioner) other than the operation of the adjustment of the temperature and the air volume.

The vibration unit 30 according to the second embodiment is configured to be controlled, caused by a determination of whether the input operation on the operation surface "P" is a gesture operation or a cursor operation, to provide different vibration modes depending on a type of the determined input operation.

Thereby, the input device 1 can cause a user to intuitively understand whether the accepted input operation is a gesture operation or a cursor operation by using the feel, and thus, can improve the operability.

Hereinafter, the detailed configuration of the input device 1 according to the second embodiment will be explained. Hereinafter the explanation will be provided under the assumption that a cursor operation and a single-touch operation are associated with each other, and a gesture operation and a multi-touch operation are associated with each other. In other words, a user is assumed to preliminary recognize an operation of the operation surface "P" by using a single-touch operation in a case of desiring a cursor operation, and an operation of the operation surface "P" by using a multi-touch operation in a case of desiring a gesture operation.

Figure 8:
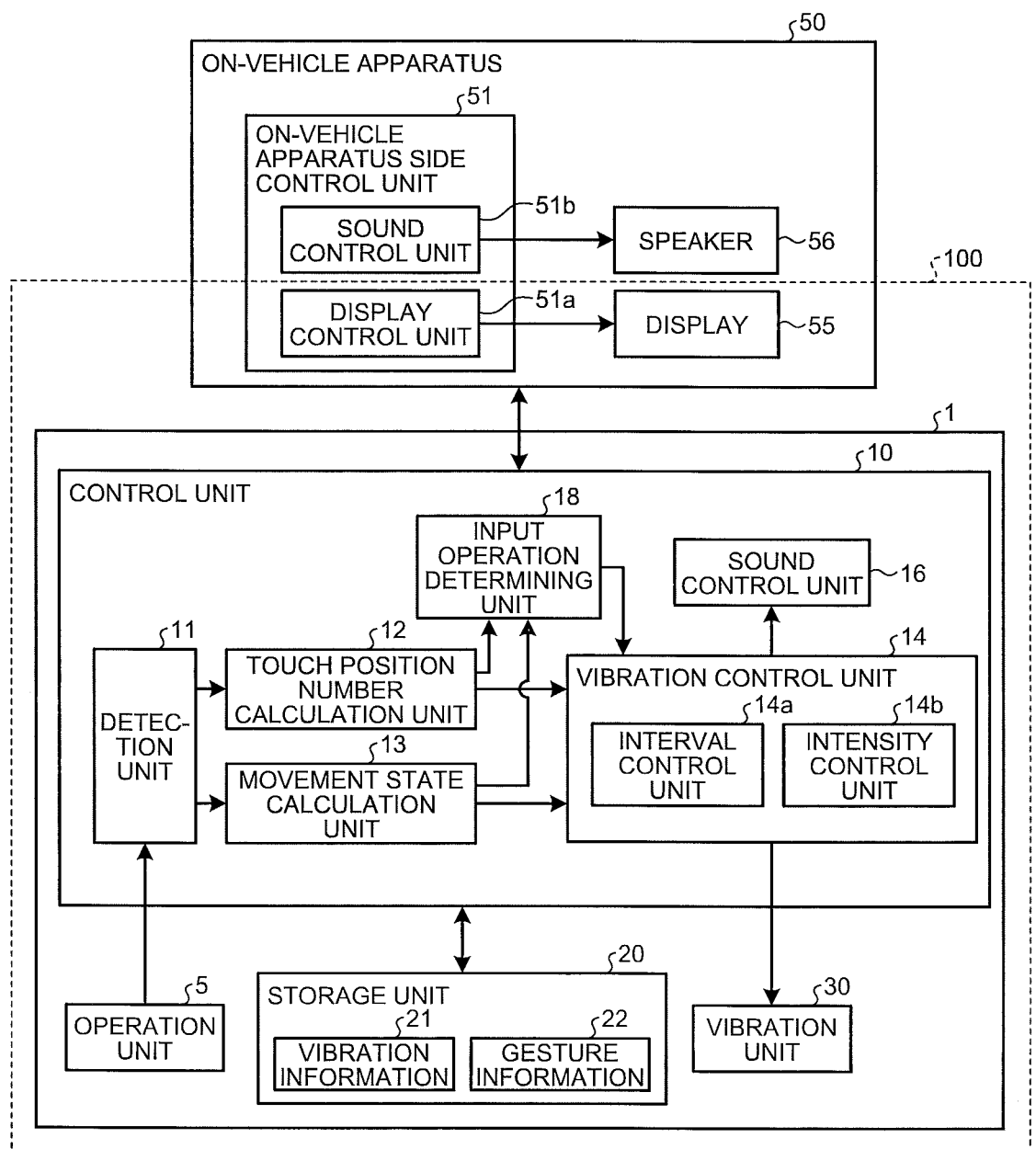
FIG. 8 is a block diagram illustrating a configuration example of an input device and the like according to a second embodiment.

FIG. 8 is a block diagram illustrating a configuration example of an input device 1 and the like according to the second embodiment. Herein, the components of the same configuration as that of the first embodiment will be provided with the same reference symbols as those of the first embodiment to omit the explanation thereof.

As illustrated in FIG. 8, the control unit 10 of the input device 1 further includes an input operation determining unit 18. Information on the number of the touch positions "C" calculated by the touch position number calculation unit 12, and information on the movement direction and movement amount of the touch position(s) "C" calculated by the movement state calculation unit 13 are input to the input operation determining unit 18.

The input operation determining unit 18 determines whether the input operation of a user performed on the operation surface "P" is a gesture operation or a cursor operation on the basis of the number of the touch positions "C". More specifically, in a case where the number of the touch positions "C" is one, because a single-touch operation is performed on the operation surface "P" as described above, the input operation determining unit 18 determines that the input operation is a cursor operation. On the other hand, in a case where the number of the touch positions "C" is two or more (here, two), because a multi-touch operation is performed on the operation surface "P", the input operation determining unit 18 determines that the input operation is a gesture operation.

The input operation determining unit 18 outputs information that indicates the determined result to the vibration control unit 14. The storage unit 20 stores gesture information 22 in addition to the aforementioned vibration information 21. Detailed contents of the gesture information 22 will be mentioned later with reference to FIG. 10.

Figure 9A:
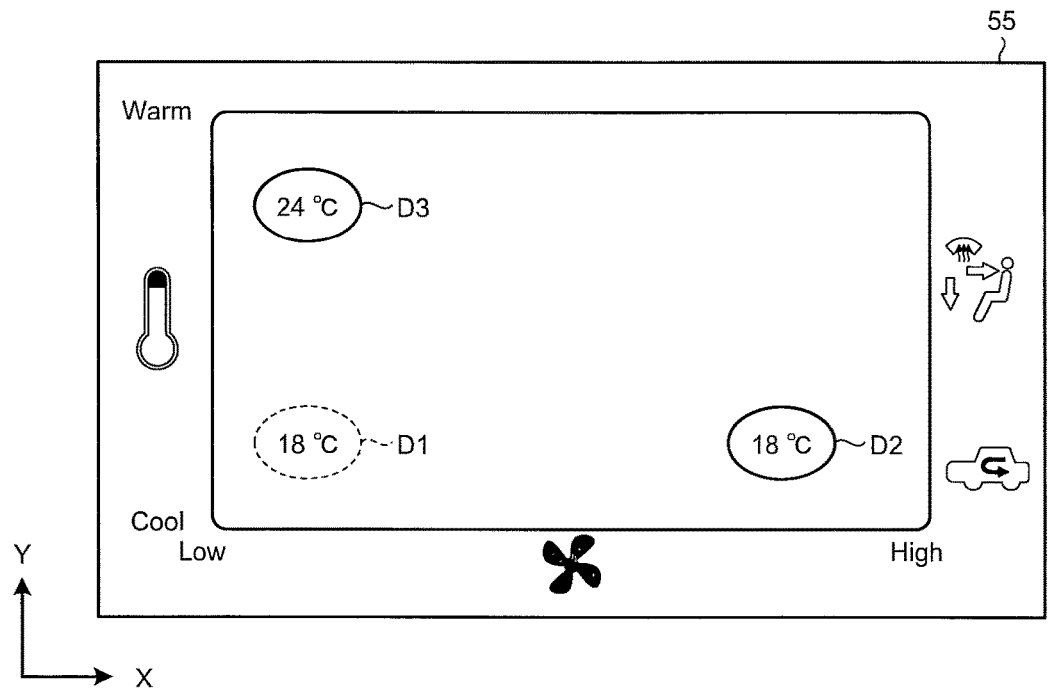
FIG. 9A is a diagram illustrating one example of a displayed image that is displayed on a display.
Figure 9B:
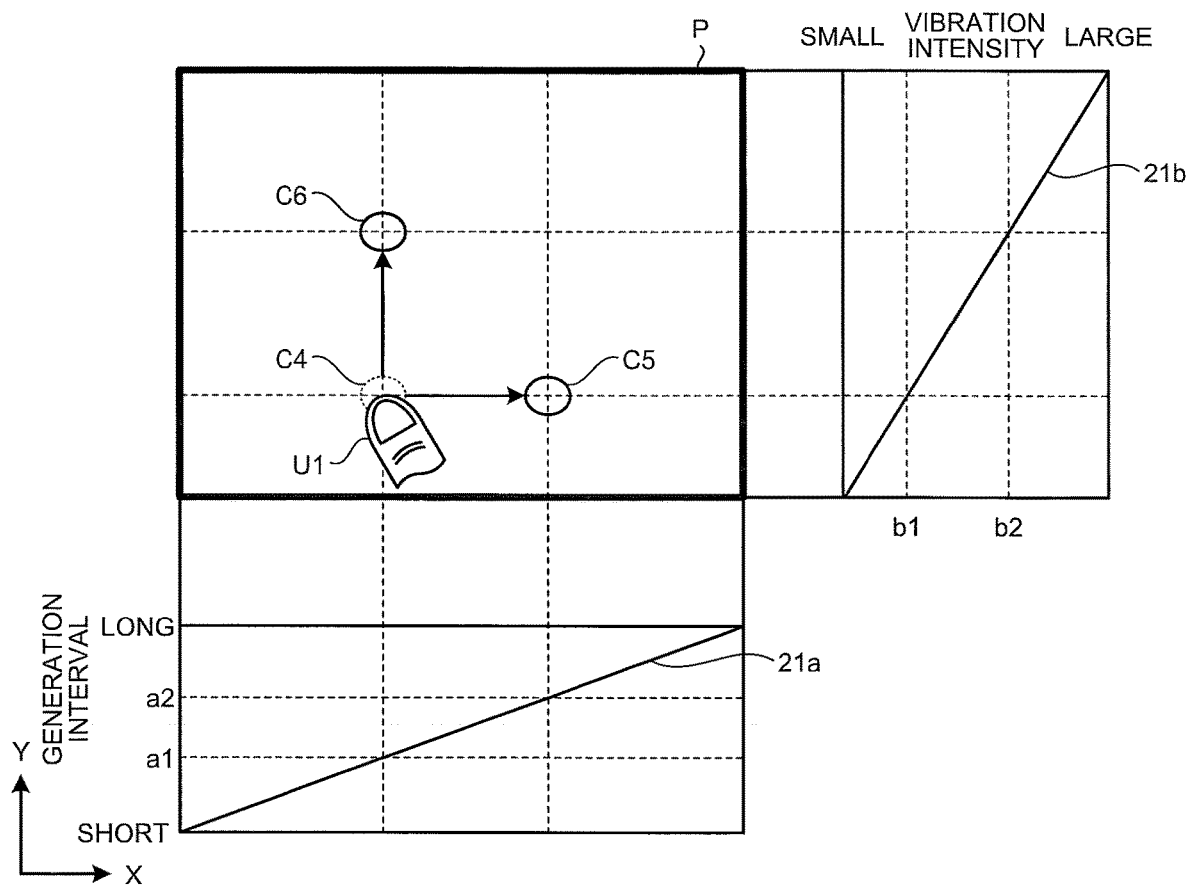
FIG. 9B is a diagram illustrating one example of a control process of a vibration control unit.

Herein, a control process of the vibration control unit 14 in a case where the input operation determining unit 18 determines that the input operation is a "cursor operation" will be explained with reference to FIGS. 9A and 9B. FIG. 9A is a diagram illustrating one example of a displayed image that is displayed on the display 55. FIG. 9B is a diagram illustrating one example of a control process of a vibration control unit 14. In FIGS. 9A and 9B, the case is assumed where the display 55 displays an image for adjusting the temperature and the air volume of an air conditioner, and the temperature and the air volume is operated by using a cursor operation.

As illustrated in FIG. 9A, the display 55 displays an image that indicates a present operation situation of the air conditioner. In the example illustrated in FIG. 9A, the air volume is set higher as the X-coordinate value of the displayed position of the image is higher, and the set temperature is set higher as the Y-coordinate value is higher. In the example illustrated in FIG. 9A, a cursor that indicates the present set temperature and the present set air volume is displayed at a display position "D1".

As illustrated in FIG. 9B, the operation surface "P" is associated with the control value of the vibration mode of the vibration unit 30 dependent on the coordinate of the touch position "C" as the vibration information 21. For example, the vibration information 21 includes vibration information 21a in the X-axis direction that is the control value with respect to the generation interval of vibration, and vibration information 21b in the Y-axis direction that is the control value with respect to the vibration intensity.

In the example illustrated in FIG. 9B, the vibration information 21a is set so that the generation interval of vibration is longer as the coordinate value in the X-axis direction is larger. The vibration information 21b is set so that the vibration intensity of vibration is larger as the coordinate value in the Y-axis direction is larger. The vibration information 21a and 21b illustrated in FIG. 9B is merely an example, and not limited thereto.

Therefore, for example, in a case where the finger of the user "U1" touches a touch position "C4" on the operation surface "P", and moves to a touch position "C5" with respect to the X-axis direction, the interval control unit 14a of the vibration control unit 14 controls the vibration mode of the vibration unit 30 so that the generation interval of vibration turns from a generation interval "a1" to a generation interval "a2".

Thereby, the feel as if the interval of concavity and convexity of the operation surface "P" increased can be given to a user. Thus, the vibration control unit 14 controls the generation interval of vibration of the vibration unit 30 depending on the movement amount of the touch position "C" in the X-axis direction, and thereby, controls the interval of the feel of the concavity and convexity on the operation surface "P" to cause the user to recognize the acceptance of a cursor operation in the X-axis direction. In this case, because the coordinate value of the touch position "C" in the Y-axis direction does not alter, the vibration intensity is constant.

In a case where the finger of the user "U1" moves from the touch position "C4" to the touch position "C5", the display control unit 51a of the on-vehicle apparatus 50 moves a cursor displayed on the display 55 to the display position "D2" dependent on the touch position "C5". The on-vehicle apparatus side control unit 51 of the on-vehicle apparatus 50 controls an air conditioner (not illustrated) to change the air volume from "weak" to "strong".

Next, for example, in a case where the finger of the user "U1" touches the touch position "C4" on the operation surface "P", and moves to the touch position "C6" with respect to the Y-axis direction, the intensity control unit 14b of the vibration control unit 14 controls the vibration mode of the vibration unit 30 so that the vibration intensity changes from an intensity "b1" to an intensity "b2".

Thereby, the feel as if concavities and convexities on the operation surface "P" enlarged can be given, to the user. Thus, the vibration control unit 14 controls the vibration intensity of the vibration unit 30 depending on the movement amount of the touch position "C" in the Y-axis direction, and causes the user to recognize the acceptance of a cursor operation in the Y-axis direction. In this case, because the coordinate value of the touch position "C" in the X-axis direction does not alter, the interval of vibration is constant.

In a case where the finger of the user "U1" moves from the touch position "C4" to the touch position "C6", the display control unit 51a of the on-vehicle apparatus 50 moves a cursor displayed on the display 55 to a display position "D3" dependent on the touch position "C6". The on-vehicle apparatus side control unit 51 of the on-vehicle apparatus 50 controls the air conditioner (not illustrated) to increase the set temperature.

Moreover, the on-vehicle apparatus side control unit 51 can also output the air volume and the set temperature after the setting from the speaker 56 as sound. The sound includes a guidance voice such as "air volume of air conditioner is set 'strong'" and "Set temperature is set to be 24 degrees". Thus, combination use of the guidance voice can cause a user to understand the operation contents also by a synergy effect of the tactile sense or the visual sense, and the auditory sense. Thereby, the operability of the user can be improved.

The case is exemplified here, in which at least one of the generation interval and the vibration intensity of vibration of the vibration unit 30 are changed on the basis of the movement amounts of the touch position(s) "C" in the respective X-axis and Y-axis directions, however, is not limited thereto. In other words, for example, the vibration control unit 14 may control the vibration intensity to increase on the basis of the movement amount of the touch position(s) "C" in the X-axis direction and may further control the vibration intensity to decrease on the basis of the movement amount of the touch position(s) "C" in the Y-axis direction, while keeping the generation interval of vibration constant.

The vibration control unit 14 is not needed to change the vibration mode depending on the movement amount of the touch position(s) "C". In other words, the vibration control unit 14 may control the vibration mode of the vibration unit 30 depending on the movement direction of the touch position(s) "C". For example, in a case where the touch position(s) "C" moves in the X-axis direction with the vibration intensity being fixed to a constant value, the vibration control unit 14 may control the vibration interval to be long, and in a case where the touch position "C" moves in the Y-axis direction, the vibration control unit 14 may control the vibration interval to be shorter than that in the case where the touch position(s) "C" moves in the X-axis direction. Other than the aforementioned, for example, in a case where the touch position "C" moves in the X-axis direction with the vibration interval being fixed to a constant value, the vibration control unit 14 may control the vibration intensity to increase, and in a case where the touch position(s) "C" moves in the Y-axis direction, the vibration control unit 14 may control the vibration intensity to be smaller than that in a case where the touch position(s) "C" moves in the X-axis direction. Thus, the vibration control unit 14 controls the vibration unit 30 depending on the movement direction of the touch position(s) "C", and therefore, a user can understand the movement direction of the touch position(s) "C" by using the difference of the generation interval of vibration and the vibration intensity.

Next, a control process of the vibration control unit 14 and the like in a case where the input operation determining unit 18 determines that an input operation is "gesture operation" will be explained with reference to FIGS. 10, and 11A to 11C. FIG. 10 is a diagram illustrating a specific example of the gesture information 22. In FIG. 10, the gesture information 22 is exemplified, which is read when the display 55 displays an image (see FIG. 9A) that indicates a present operation situation of an air conditioner.

Figure 11A:
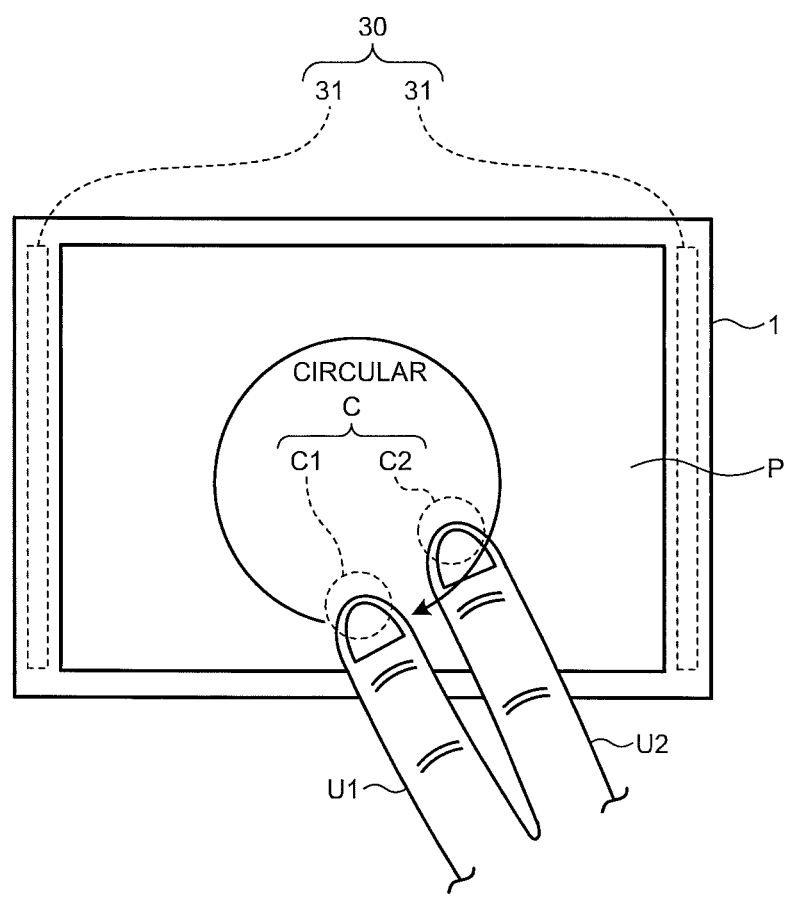
FIG. 11A is a diagram illustrating a specific example of a gesture operation.
Figure 11B:
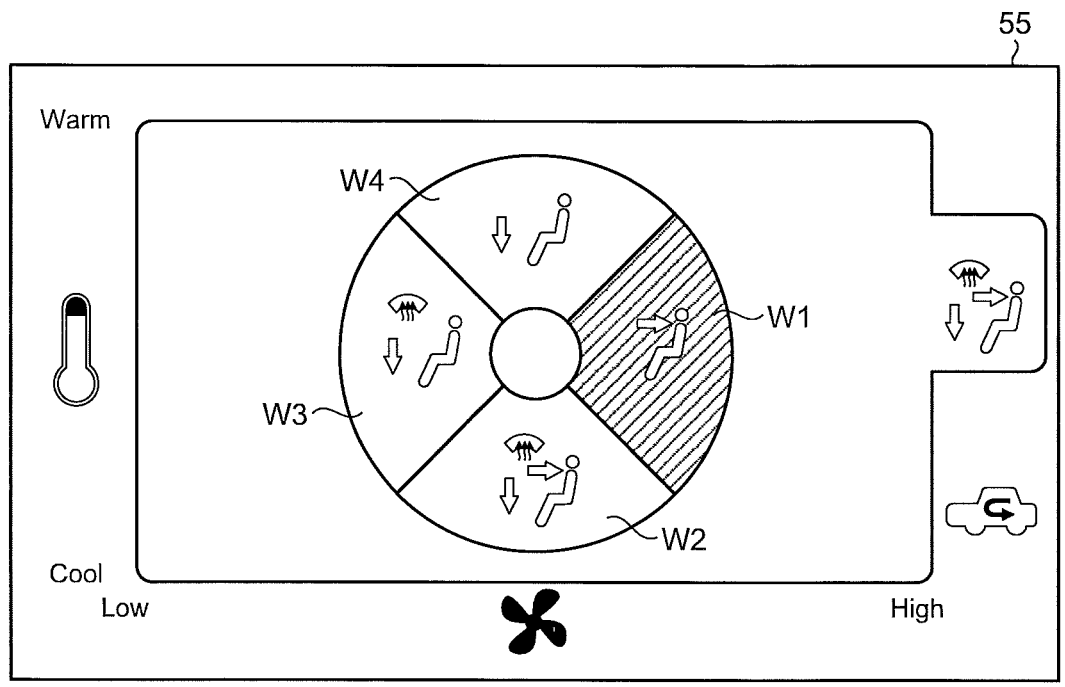
FIG. 11B is a diagram illustrating one example of an image that is displayed on the display.
Figure 11C:
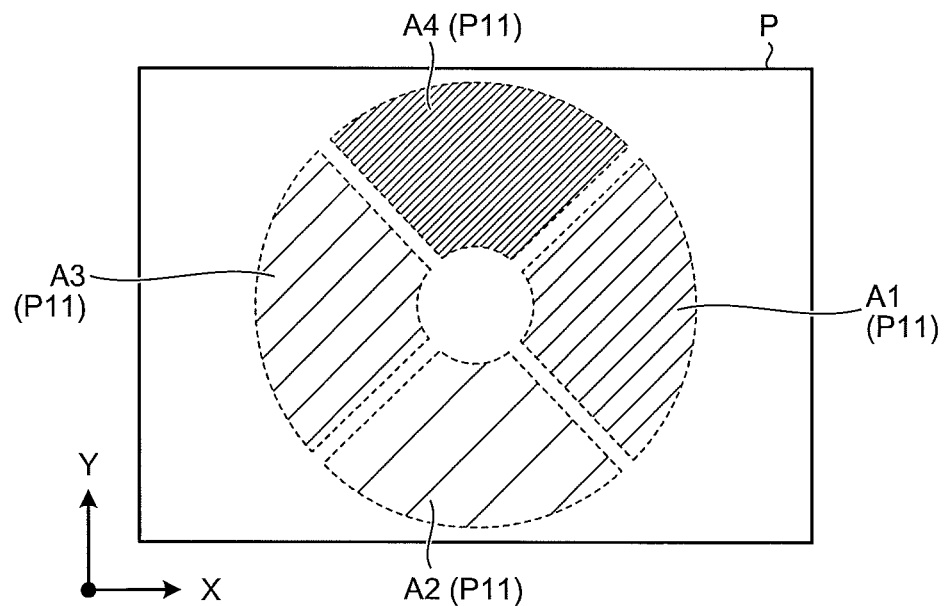
FIG. 11C is a diagram illustrating one example of a control process of the vibration control unit.

FIG. 11A is a diagram illustrating a specific example of a gesture operation. FIG. 11B is a diagram illustrating one example of an image that is displayed on the display 55. FIG. 11C is a diagram illustrating one example of a control process of the vibration control unit 14.

The gesture information 22 includes information in which functions and vibration patterns of the vibration elements 31 respectively dependent on various gesture operations are defined in a case where, for example, various gesture operations are performed on the operation surface "P".

Specifically, as illustrated in FIG. 10, the gesture information 22 includes, for example, a target device item, a gesture operation item, a function item, and a vibration pattern item. Devices of the on-vehicle apparatus 50 to be controlled by the input device 1, such as an air conditioner, an audio, a navigation device, and a telephone, are assigned to the target device item.

A predetermined gesture operation is assigned to the air conditioner as the target device item. For example, as illustrated in FIG. 1A, the gesture operation of sliding the fingers "U1" and "U2" so as to draw a "circular" trajectory on the operation surface "P" is assigned to the air conditioner.

In the gesture information 22, in a case where the gesture operation is "circular", a function of "wind direction adjustment" is assigned to the function item, and a vibration pattern P10 dependent on the gesture operation is assigned to the vibration pattern item. The vibration pattern P10 is assumed to be set to differ from the vibration mode illustrated in FIG. 9B, in other words, the vibration mode in a case of a cursor operation.

Other than the aforementioned "circular", the gesture operation of sliding the fingers "U1" and "U2" so as to draw a "triangular" or "quadrangular" trajectory on the operation surface "P" is assigned to the air conditioner as the target device item.

In the gesture information 22, in a case where the gesture operations are "triangular" and "quadrangular", functions of "internal air circulation/outside air introduction switch" and "temperature/air volume adjustment" are assigned to the respective function items, and the vibration pattern P10 is assigned to the vibration pattern items that is similar to the pattern in a case where the gesture operation is "circular". In other words, the common vibration pattern P10 is set in the gesture operations.

Therefore, for example, in a case where a user performs a multi-touch operation on the operation surface "P" as illustrated in FIG. 11A, in a state where the display 55 displays an image (see FIG. 9A) for adjusting the temperature and the air volume of an air conditioner, because the number of the touch positions "C" is two, the input operation determining unit 18 determines that the input operation is the gesture operation.

Subsequently, for example, in a case (see FIG. 11A) where the user performs the gesture operation of drawing "circular" by using a multi-touch operation, the input operation determining unit 18 estimates that the trajectory on the touch position "C" is the gesture operation dependent on "circular" at the stage of the detection of gradual longitudinal→slant→lateral change of the trajectory of the touch positions "C".

Illustration thereof is omitted, in a case where the user performs the gesture operation of drawing "triangular" by using a multi-touch operation, the input operation determining unit 18 estimates that the trajectory of the touch positions "C" is the gesture operation dependent on "triangular" at the stage of the detection of discrete aslant→lateral→aslant change of the trajectory of the touch positions "C".

The case is exemplified in the aforementioned, in which the gesture operations are "circular" and "triangular", however, the gesture operation may be a operation of drawing shapes such as "quadrangular", "infinite (∞)", and "letter (α)".

Hereinafter, a case will be exemplified to explain, in which a user draws "circular" on the operation surface "P" by using a multi-touch operation, in other words, the user desires to call the function of "wind direction adjustment".

In a case where the user performs a gesture operation on the operation surface "P", the input operation determining unit 18 outputs a signal dependent on the gesture operation to the vibration control unit 14 and the on-vehicle apparatus 50. In other words, for example, the input operation determining unit 18 extracts "air conditioner" as a target device, "wind direction adjustment" as a function, and "vibration pattern 'P10'" as a vibration pattern on the basis of the gesture information 22. The input operation determining unit 18 outputs a signal that indicates the extracted vibration pattern to the vibration control unit 14, and further outputs a signal that indicates the extracted target device and function to the on-vehicle apparatus 50.

Specifically, in a case where a user desires a gesture operation to perform a multi-touch operation, the input operation determining unit 18 determines that the input operation is the gesture operation on the basis of the touch positions "C", and outputs a signal that indicates the vibration pattern "P10" to the vibration control unit 14.

The vibration control unit 14 controls the vibration unit 30 to be in the vibration mode of the vibration pattern "P10". As described above, the vibration pattern "P10" is the unique vibration mode dependent on the gesture operation, and is set so as to differ from the vibration mode in a case of a cursor operation. Therefore, the user can recognize that the input device 1 recognizes the gesture operation by the difference from the feel of the operation surface "P" during a cursor operation.

In a case where a signal that indicates the fact that a controlled target is the wind direction setting of the air conditioner is input via the input operation determining unit 18, as illustrated in FIG. 11B, the display control unit 51a of the on-vehicle apparatus 50 causes the display 55 to display an image of the wind direction setting of an air conditioner. In the image, for example, four wind directions that may be set in the air conditioner are displayed. On the image of the presently set wind direction, the color and the like that differ from other wind directions may be superimposed to display so that the user can recognize visually. As described above, when the display 55 displays an image of the wind direction setting of the air conditioner caused by the gesture operation, the gesture operation is terminated, and is shifted to a cursor operation thereafter.

In a case where an area "A1" includes the touch position "C" of the finger of the user in operation, the display control unit 51a superimposes the color on the image of a wind direction "W1" dependent on the area "A1" displayed on the display 55 to display the image. In a case where the area "A1" includes the touch position "C" of the finger of the user in operation, the on-vehicle apparatus side control unit 51 sets the wind direction to be the wind direction "W1" dependent on the area "A1".

For example, the vibration pattern "P11" is assigned to the aforementioned areas "A1" to "A4". The vibration pattern "P11" will be explained with reference to FIG. 11C. In FIG. 11C, for the convenience of understanding, the information on the vibration pattern "P11" dependent on the areas "A1" to "A4" on the operation surface "P" is indicated using diagonal lines on the operation surface "P". The difference between types of diagonal lines indicates the difference between the vibration modes.

As illustrated in FIG. 11C, the vibration pattern "P11" is information on the vibration mode of the vibration unit 30 of each of the areas "A1" to "A4" on the operation surface "P". In this case, the vibration control unit 14 controls the vibration mode of the vibration unit 30 on the basis of the vibration pattern "P11".

Specifically, for example, in a case where the touch position(s) "C" is on the areas "A1" to "A4", when acquiring the touch position(s) "C", the vibration control unit 14 controls the vibration unit 30 so that the vibration modes of the areas "A1" to "A4" differ from each other.

The vibration pattern of the vibration mode that is different from the vibration pattern "P10" may be set to a gesture other than the aforementioned gesture of "circular". Specifically, as illustrated in the vibration pattern items in FIG. 10 by using parentheses, for example, the vibration pattern "P12" may be assigned to the gesture of "triangular" and the vibration pattern "P13" may be assigned to the gesture of "quadrangular". The vibration modes that differ from the vibration pattern "P10" may be set to the vibration patterns "P12" to "P15".

Thus, when being determined as the gesture operation, the vibration control unit 14 controls the vibration unit 30 to be in the vibration mode dependent on the gesture operation, in other words, the vibration pattern "P10" in accordance with the movement of the touch, position(s) "C". Subsequently, the vibration control unit 14 may control the vibration unit 30, at the timing when the gesture is determined to be a gesture other than "circular" by the trajectory of the finger, to be in the vibration mode dependent on the gesture, in other words, one of the vibration patterns "P12" to "P15".

In the second embodiment, because the input device 1 is configured as described above, for example, in a case where a user desires the gesture operation to perform a multi-touch operation, the input device 1 can determine that the input operation is the gesture operation immediately after a touch of the user by using two fingers.

The input device 1 controls the vibration unit 30 to be in the vibration mode dependent on the gesture operation, and thus, the tactile sense of the vibration mode dependent on the gesture operation can be given to the user immediately after a touch to the operation surface "P" by using two fingers, moreover, the feel of different vibration modes can be given depending on the types of the gestures. Thereby, the input device 1 can cause the user to intuitively understand the acceptance of the gesture operation and the type of the accepted gesture by using the feel, and thus, can improve the operability.

Moreover, the user can change a controlled target of the input device 1 and operation contents of the controlled target by using a plain gesture operation. Therefore, when the user memorizes the gesture operation, the user can easily call a desired target device and function thereby. Therefore, operability of the user can be improved.

The gesture information 22 illustrated in FIG. 10 is merely an example, and can be properly altered depending on a situation of use by the user, a device to be connected, etc.

5. Process of Input Device According to Second Embodiment

Figure 12:
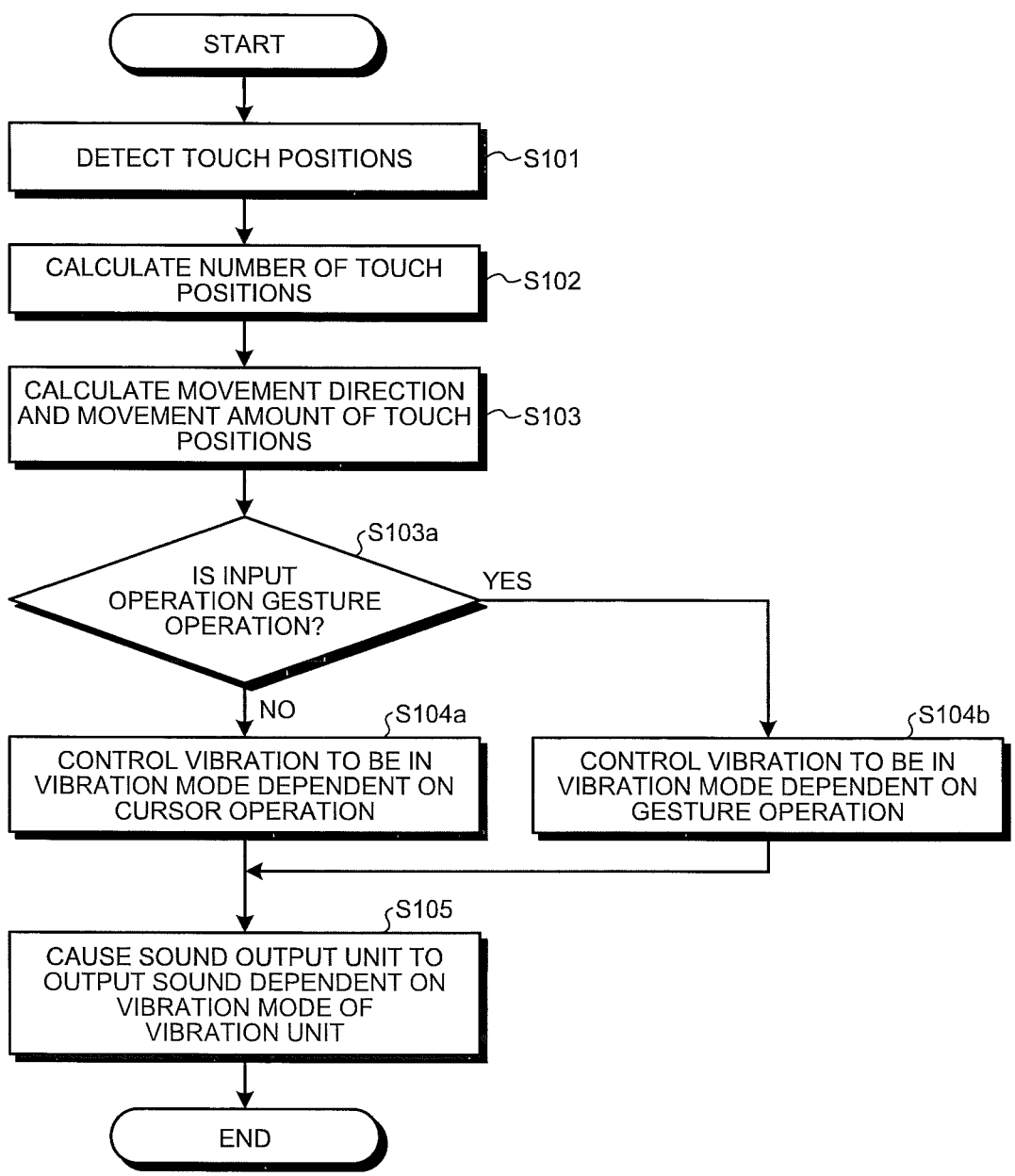
FIG. 12 is a flowchart illustrating one example of a processing procedure executed by the input device according to the second embodiment.

Next, a processing procedure that is executed by the input device 1 according to the second embodiment will be explained with reference to FIG. 12. FIG. 12 is a flowchart illustrating one example of a processing procedure executed by the input device 1 according to the second embodiment.

As illustrated in FIG. 12, in processes of Steps S101 to S103 according to the second embodiment, processes similar to those of Steps S101 to S103 according to the first embodiment are executed. Next, the input operation determining unit 18 determines whether or not the input operation is a gesture operation on the basis of the number of the touch positions "C" (Step S103a).

When being determined that the input operation is not a gesture operation, in other words, is a cursor operation (Step S103a: No), the vibration control unit 14 controls the vibration unit 30 to be in a vibration mode dependent on the cursor operation in accordance with the movement of the touch position "C" (Step S104a).

On the other hand, when being determined that the input operation is a gesture operation (Step S103a: Yes), the vibration control unit 14 controls the vibration unit 30 to be in a vibration mode dependent on the gesture operation in accordance with the movement of the touch positions "C" (Step S104b).

When a process of aforementioned Step S104a or Step S104b is terminated, the sound control unit 16 executes the process of aforementioned Step S105, and terminates the process.

In the aforementioned embodiments, the change of the vibration mode caused by the control of the generation interval and the intensity of vibration has been exemplified, however, is not limited thereto. For example, the vibration mode may be set to be correlated to (associated with) the number of fingers of a user being in contact with the operation surface "P".

In other words, in a case where one finger is in contact with the operation surface "P" and the number of the touch positions "C" is one, the vibration mode may be set to be the feel as if concavities and convexities on the operation surface "P" existed one-by-one, for example "click", "click" . . . . On the other hand, in a case where two fingers are in contact with the operation surface "P" and the number of the touch positions "C" is two, the vibration mode may be set to be the feel as if concavities and convexities on the operation surface "P" existed two-by-two, for example "click, click", "click, click" . . . . Thereby, the input device 1 can cause a user to more intuitively understand whether the accepted input operation is a single-touch operation or a multi-touch operation by using the feel, and thus, the operability can be effectively improved.

The aforementioned vibration patterns and the like of the vibration information 21 and the gesture information 22 may have a configuration in which a table or a map that associates the coordinate of the touch position "C", the generation interval, and the vibration intensity with one another by using experiments and the like is preliminary stored in the storage unit 20, and the table and the map are called to execute the vibration control.

In the aforementioned, an operation by using two fingers being in contact with the operation surface "P" is exemplified as a multi-touch operation. However, not limited thereto, an operation by using three or more fingers being in contact with the operation surface "P" may be accepted as a multi-touch operation.

Moreover, the case in which the vibration control unit 14 controls the generation interval of vibration, in other words, an ON/OFF ratio of vibration, of the vibration unit 30 to control the vibration mode non-continuously is exemplified in, the aforementioned embodiment, however, not limited thereto. In other words, the input device 1 may change the vibration mode of the vibration unit 30 continuously.

Figure 13A:
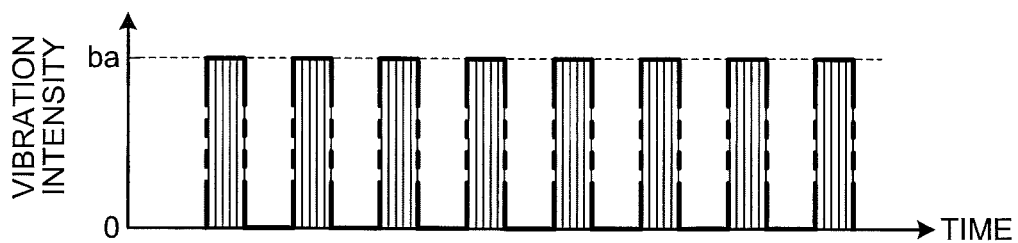
FIGS. 13A to 13C are schematic diagrams illustrating specific examples of vibration modes.
Figure 13B:
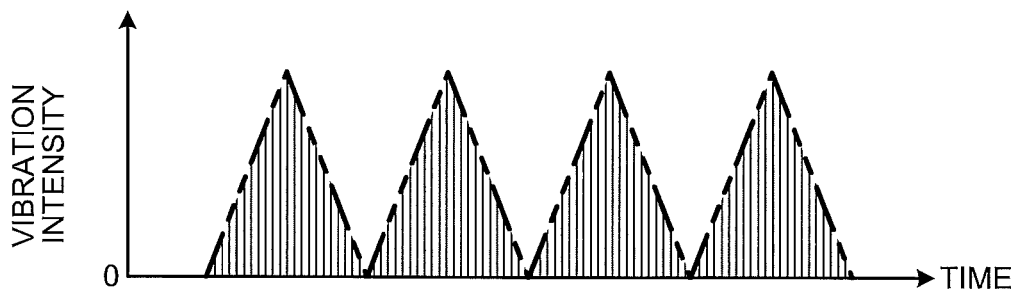
Figure 13C:
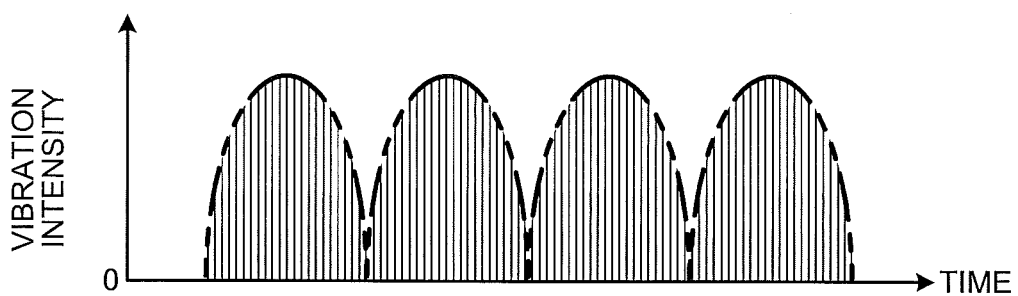

Herein, the cases in which the input device 1 non-continuously changes the vibration mode and changes the vibration mode continuously will be explained with reference to FIGS. 13A to 13C. FIGS. 13A to 13C are schematic diagrams illustrating specific examples of vibration modes. FIG. 13A exemplifies the case where the vibration mode is non-continuously controlled. FIGS. 13B and 13C exemplify cases where the vibration intensity is continuously changed.

In FIGS. 13A to 13C, the vertical axis indicates the vibration intensity and the horizontal axis indicates the time. In FIGS. 13A to 13C, one line extending in the vertical axis direction indicates a single ultrasonic vibration.

First, the case in which the vibration mode is non-continuously controlled, in other words, the aforementioned feel of concavity and convexity is given will be explained with reference to FIG. 13A. As illustrated in FIG. 13A, the vibration control unit 14 executes the control in which the vibration intensity is non-continuously changed between the vibration intensity "ba" and the vibration intensity "zero" depending on the time so that the waveform of the ultrasonic vibration becomes a rectangular shape.

On the other hand, in the examples illustrated in FIGS. 13B and 13C, the vibration control unit 14 executes the control in which the vibration intensity is continuously changed. Specifically, in the example illustrated in FIG. 13B, the vibration control unit 14 executes the control in which an interval of changing the vibration intensity in gradual increase and an interval of changing the vibration intensity in gradual decrease depending on the time are repeated in a predetermined cycle so that the waveform of the ultrasonic vibration becomes a triangular-wave shape.

In the example illustrated in FIG. 13C, the vibration control unit 14 executes the control in which the vibration mode is continuously changed so that the time and the vibration intensity include a periodic curve to form the waveform of the ultrasonic vibration to be a sine-wave shape.

Thus, the input device 1 can control the vibration mode non-continuously and continuously. The relations illustrated in FIGS. 13A to 13C between the vibration intensity and the time is merely an example, and not limited thereto. The input device 1 can execute the control so that the waveforms illustrated in FIGS. 13A to 13C are combined. Thereby, the input device 1 can give the feel other than the feel of concavity and convexity to a user.

As described above, the input device 1 may be configured to vibrate the operation surface "P" in a frequency band of an ultrasonic region or less (frequency in low frequency band). In a case of the low frequency vibration, for example, the low frequency vibration indicated by an envelope curve of the ultrasonic vibration illustrated in FIGS. 13A to 13C may be employed. In FIGS. 13A to 130, the aforementioned envelope curves are illustrated by using imaginary lines.

In the aforementioned embodiments, for example, in a case where the number of fingers of a user being in contact with the operation surface "P" changes during the operation, in other words, in a case where for example, the number of the touch positions "C" changes from one to two (or from two to one), the input device 1 may immediately set the vibration mode dependent on the changed number of the touch positions "C". In this case, the input device 1 does not alter the contents of the function to be operated for a little time (for example, approximately one second), and may alter the contents after the one or more seconds continuation of the state of the changed number of the touch positions "C".

Thereby, for example, even in a case where a finger other than the finger for the operation touches the operation surface "P" by any chance, or a part of the fingers for the operation departs from the operation surface "P" despite that the user has no intention of changing the number of the fingers, the user can be caused to recognize the change of the number of the detected fingers by the change of the vibration. Therefore, for example, when the user recognizes the change of the number of the fingers detected by the input device 1, if immediately returns the finger, because the contents of the function to be operated is continued without being altered, receipt of the uncomfortable feel of an operation and execution of an unintended erroneous operation can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An input device, comprising:
    a memory that stores therein vibration information in which combinations of (i) a plurality of numbers of touch positions and (ii) movement directions of the touch positions are associated with respective different functions of an object to be operated, and the different functions are associated with a plurality of vibration patterns of a vibrator that are different from one another; and
    a processor operatively connected to the memory, the processor programmed to:
        detect one or more touch positions on an operation surface;
        calculate a number of the detected touch positions;
        calculate a movement direction of the detected touch positions;
        cause the vibrator to vibrate the operation surface; and
        control, based on the vibration information stored in the memory, the vibrator to provide a vibration pattern of the plurality of different vibration patterns, the provided vibration pattern corresponding to a combination of the calculated number of the detected touch positions and the calculated movement direction of the detected touch positions.

2. The input device according to claim 1, wherein the processor is further programmed to:
    determine whether an input operation is a gesture operation or a cursor operation based on the number of the touch positions; and
    control the vibrator to provide different vibration modes depending on a type of the determined input operation.

3. The input device according to claim 2, wherein the processor is further programmed to:
    determine, in a case where the number of the touch positions is a predetermined number, that the input operation is the gesture operation; and
    control, in a case where the processor determines that the input operation is the gesture operation, the vibrator to provide a vibration mode dependent on the gesture operation in accordance with movement of the touch positions.

4. The input device according to claim 1, wherein the processor is further programmed to:
    cause a speaker to output a sound dependent on the vibration mode of the vibrator.

5. The input device according to claim 2, wherein the processor is further programmed to:
    cause a speaker to output a sound dependent on the vibration mode of the vibrator.

6. The input device according to claim 3, wherein the processor is further programmed to:
    cause a speaker to output a sound dependent on the vibration mode of the vibrator.

7. A display device, comprising:
the input device according to claim 1;
a display; and
a display controller that causes the display to display an image depending on the one or more touch positions.

8. The display device according to claim 7, wherein the display controller changes an image to be displayed on the display based on the number of the touch positions.

9. A method for controlling an input device including a memory that stores therein vibration information in which combinations of (i) a plurality of numbers of touch positions and (ii) movement directions of the touch positions are associated with respective different functions of an object to be operated, and the different functions are associated with a plurality of vibration patterns of a vibrator that are different from one another, the method comprising:
    detecting one or more touch positions on an operation surface;
    calculating a number of the touch positions detected in the detecting;
    calculating a movement direction of the detected touch positions; and
    controlling, based on the vibration information stored in the memory, the vibrator to provide a vibration pattern of the plurality of different vibration patterns, the provided vibration pattern corresponding to a combination of the calculated number of the detected touch positions and the calculated movement direction of the detected touch positions, the vibrator vibrating the operation surface.

10. The input device according to claim 1, wherein the processor is further programmed to:
    when information indicating a function dependent on an input operation is not displayed on a display, display an image on the display depending on the touch position.

11. An input device, comprising:
a memory that stores therein vibration information in which a plurality of numbers of touch positions are associated with a plurality of different functions of an object to be operated and a plurality of different vibration patterns of a vibrator; and
a processor operatively connected to the memory, the processor programmed to:
    detect one or more touch positions on an operation surface;
    calculate a number of the detected touch positions;
    cause the vibrator to vibrate the operation surface;
    control, based on the vibration information stored in the memory, the vibrator to provide a vibration pattern of the plurality of different vibration patterns according to the calculated number of the touch positions;
    when a function is an album-up function, control the vibrator to provide, to a user, a feel of pushing an image of an album in a depth direction of a display screen; and
    when a function is an album-down function, control the vibrator to provide, to the user, a feel of pulling out the image of the album from the display screen.

* * * * *